(12) United States Patent
Hao et al.

(10) Patent No.: US 8,280,883 B2
(45) Date of Patent: Oct. 2, 2012

(54) NETWORKED ADDRESS BOOK

(75) Inventors: Jack Jianxiu Hao, Lexington, MA (US); Jian Huang, Sudbury, MA (US); Diego S Rozensztejn, Brookline, MA (US); Fred Scheer, Bradford, MA (US); Gaurav Tanna, Brookline, MA (US); Wei Xia, Sudbury, MA (US); Xuefeng Yao, Waban, MA (US); Fang Zhu, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 765 days.

(21) Appl. No.: 12/254,260

(22) Filed: Oct. 20, 2008

(65) Prior Publication Data
US 2009/0157732 A1 Jun. 18, 2009

Related U.S. Application Data

(60) Provisional application No. 61/013,549, filed on Dec. 13, 2007, provisional application No. 61/018,044, filed on Dec. 31, 2007.

(51) Int. Cl.
*G06F 7/00* (2006.01)
(52) U.S. Cl. .................................................. 707/736
(58) Field of Classification Search ................... 707/736
See application file for complete search history.

(56) References Cited

U.S. PATENT DOCUMENTS

| | | | | |
|---|---|---|---|---|
| 4,875,159 A * | 10/1989 | Cary et al. | | 1/1 |
| 5,727,202 A * | 3/1998 | Kucala | | 1/1 |
| 6,131,096 A * | 10/2000 | Ng et al. | | 1/1 |
| 6,374,241 B1 * | 4/2002 | Lamburt et al. | | 1/1 |
| 6,983,308 B1 * | 1/2006 | Oberhaus et al. | | 709/206 |
| 7,860,825 B2 * | 12/2010 | Chatterjee et al. | | 707/610 |
| 2001/0044805 A1 * | 11/2001 | Multer et al. | | 707/201 |
| 2001/0051979 A1 * | 12/2001 | Aufricht et al. | | 709/203 |
| 2002/0010807 A1 * | 1/2002 | Multer et al. | | 709/328 |
| 2002/0029227 A1 * | 3/2002 | Multer et al. | | 707/203 |
| 2002/0087632 A1 * | 7/2002 | Keskar | | 709/204 |
| 2003/0159136 A1 * | 8/2003 | Huang et al. | | 717/171 |
| 2003/0167446 A1 * | 9/2003 | Thomas | | 715/513 |
| 2003/0237047 A1 * | 12/2003 | Borson | | 715/513 |
| 2004/0083263 A1 * | 4/2004 | Richardson et al. | | 709/204 |
| 2004/0267779 A1 * | 12/2004 | Carter et al. | | 707/100 |
| 2005/0120084 A1 * | 6/2005 | Hu et al. | | 709/206 |
| 2005/0164651 A1 * | 7/2005 | Ollis et al. | | 455/100 |
| 2006/0080284 A1 * | 4/2006 | Masonis et al. | | 707/3 |
| 2006/0172724 A1 * | 8/2006 | Linkert et al. | | 455/412.1 |
| 2007/0005579 A1 * | 1/2007 | Grewal et al. | | 707/3 |
| 2007/0013968 A1 * | 1/2007 | Ebaugh et al. | | 358/448 |
| 2007/0185919 A1 * | 8/2007 | Kaplan et al. | | 707/201 |
| 2008/0153466 A1 * | 6/2008 | Morel | | 455/414.2 |
| 2009/0150488 A1 * | 6/2009 | Martin-Cocher et al. | | 709/204 |

FOREIGN PATENT DOCUMENTS

GB 1384136 * 2/1975 ............ 15/20

* cited by examiner

*Primary Examiner* — Tony Mahmoudi
*Assistant Examiner* — Michael Le

(57) ABSTRACT

A device receives one or more contacts provided in an address book associated with a user, and receives profile information associated with one or more other users. The device also links the profile information with one or more corresponding contacts provided in the address book, and provides the address book with the linked profile information to one or more user devices associated with the user.

24 Claims, 19 Drawing Sheets

FIG. 5
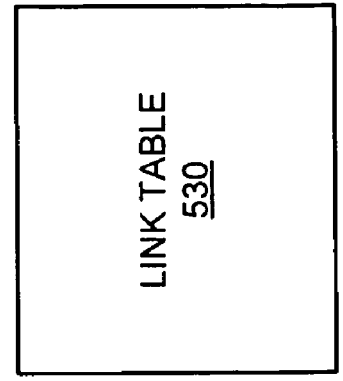
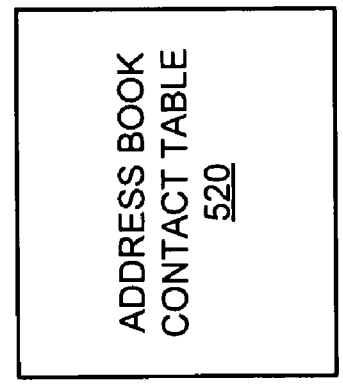
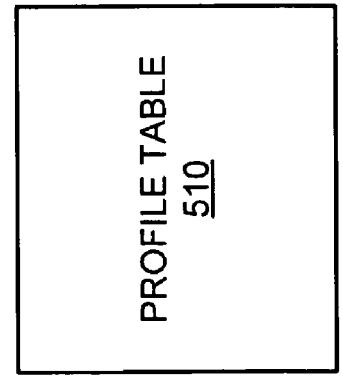

FIG. 6

| | 680 | 690 |
|---|---|---|
| Profile ID | 001 | *** |
| Profile Name | Richard Smith | *** |
| Profile Passcode | Encrypted | *** |
| Last Name | Smith | *** |
| First Name | Richard | *** |
| Title | Doctor | *** |
| Work Street | 40 Sylvan Road | *** |
| Work City | Waltham | *** |
| Work State | MA | *** |
| Work Phone | 781-111-1111 | *** |
| Professional Experiences | Description | *** |
| Home Street | 33 Lexington Street | *** |
| Home City | Newton | *** |
| Home State | MA | *** |
| Home Phone | 555-555-5555 | *** |
| Cell Phone | 666-666-6666 | *** |
| Email | Richard.Smith@email.com | *** |
| Favorite Movie | Gone With The Wind | *** |
| Favorite Sport | Football | *** |
| Personal Pictures | List of pictures | *** |
| Personal Videos | List of videos | *** |
| Personal Account Information | Login/information | |

| | 745 | 750 |
|---|---|---|
| Contact Record ID | 001 | *** |
| Contact Owner ID | 002 | *** |
| Contact Profile ID | 001 | *** |
| Connection Status | none, pending, connected, ... | *** |
| Last Name | Smith | *** |
| First Name | Richard | *** |
| Title | Doctor | *** |
| Work City | Waltham | *** |
| Work Phone | 781-111-1111 | *** |
| Home Phone | 555-555-5555 | *** |
| Home City | Newton | *** |
| Cell Phone 1 | 666-666-6666 | *** |
| Cell Phone 2 | 777-777-7777 | *** |
| Email 1 | Richard.Smith@email.com | *** |
| Email 2 | rsmith@email.com | *** |

FIG. 8

| Profile Table Record ID | Address Book Contact Table Record ID | Link Status |
|---|---|---|
| 001 | 004 | Linked |
| 002 | 005 | Pending |
| 003 | 006 | Disconnected |

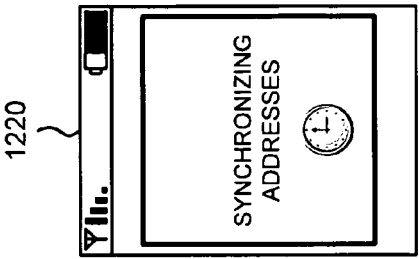
FIG. 12C
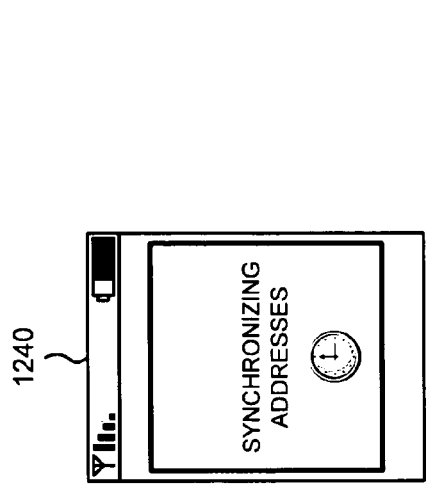
FIG. 12E
FIG. 12B
FIG. 12D
FIG. 12A

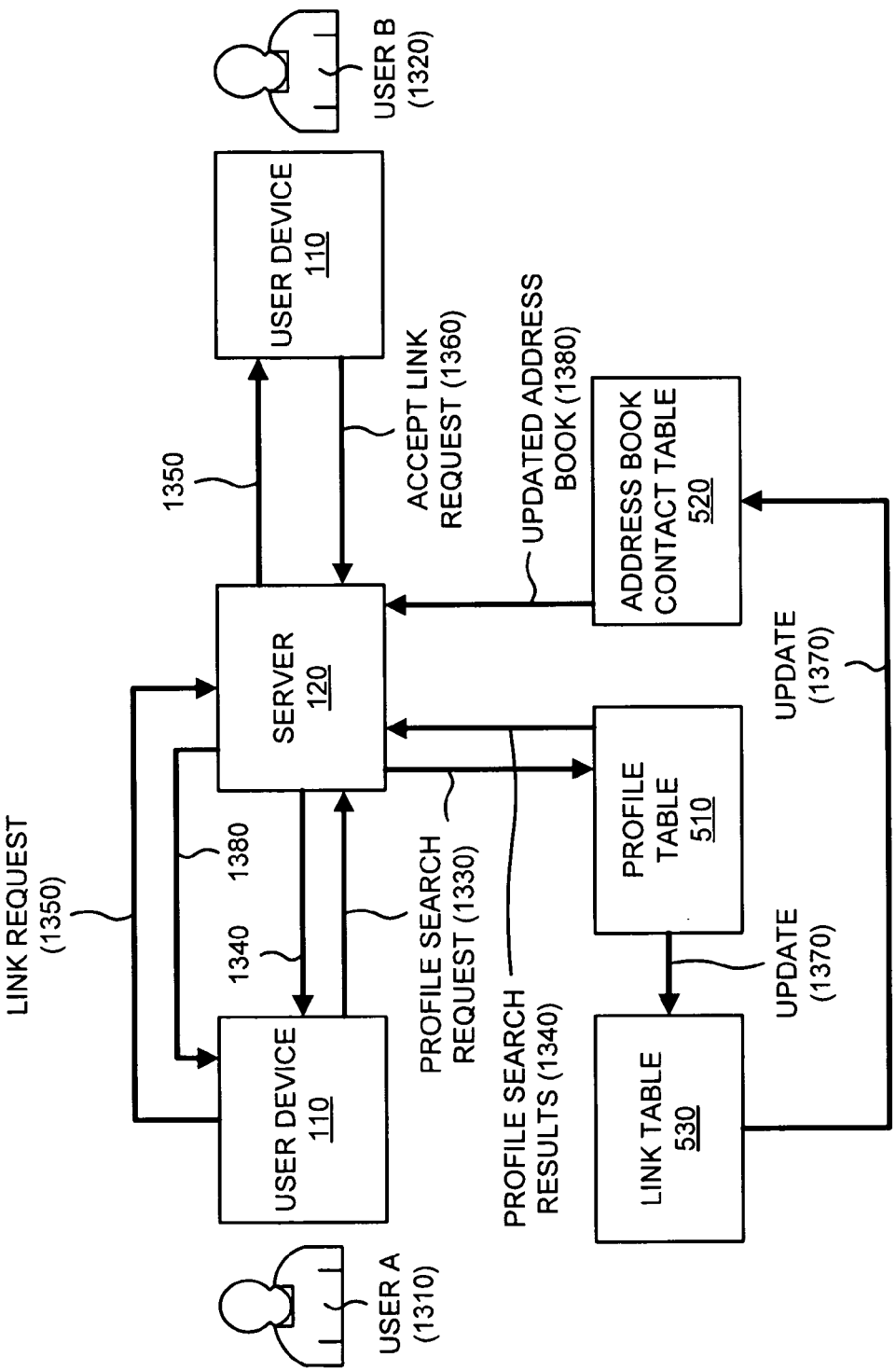

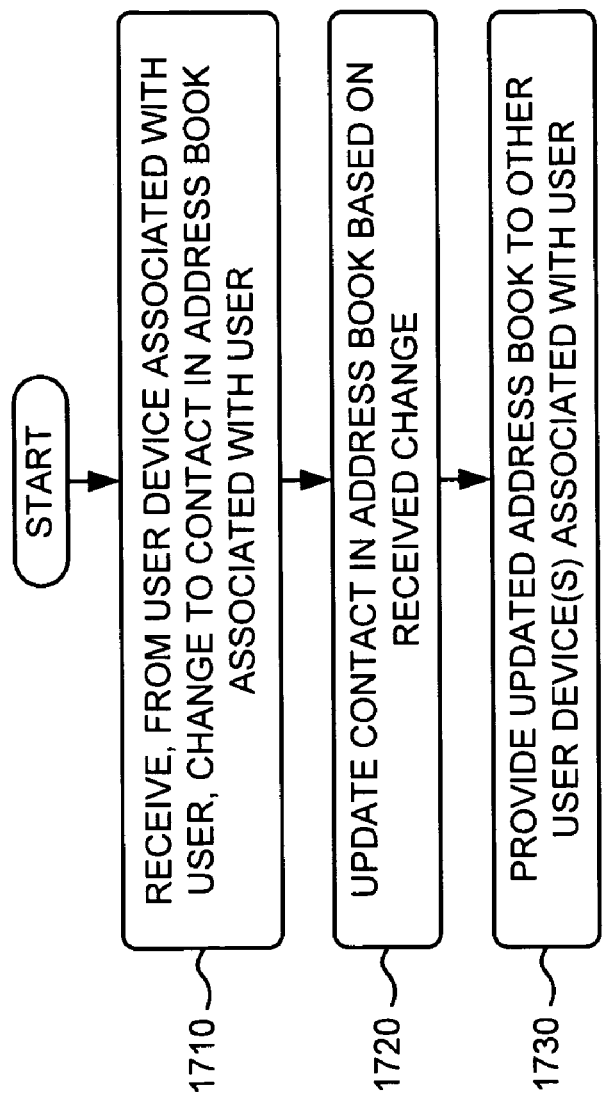

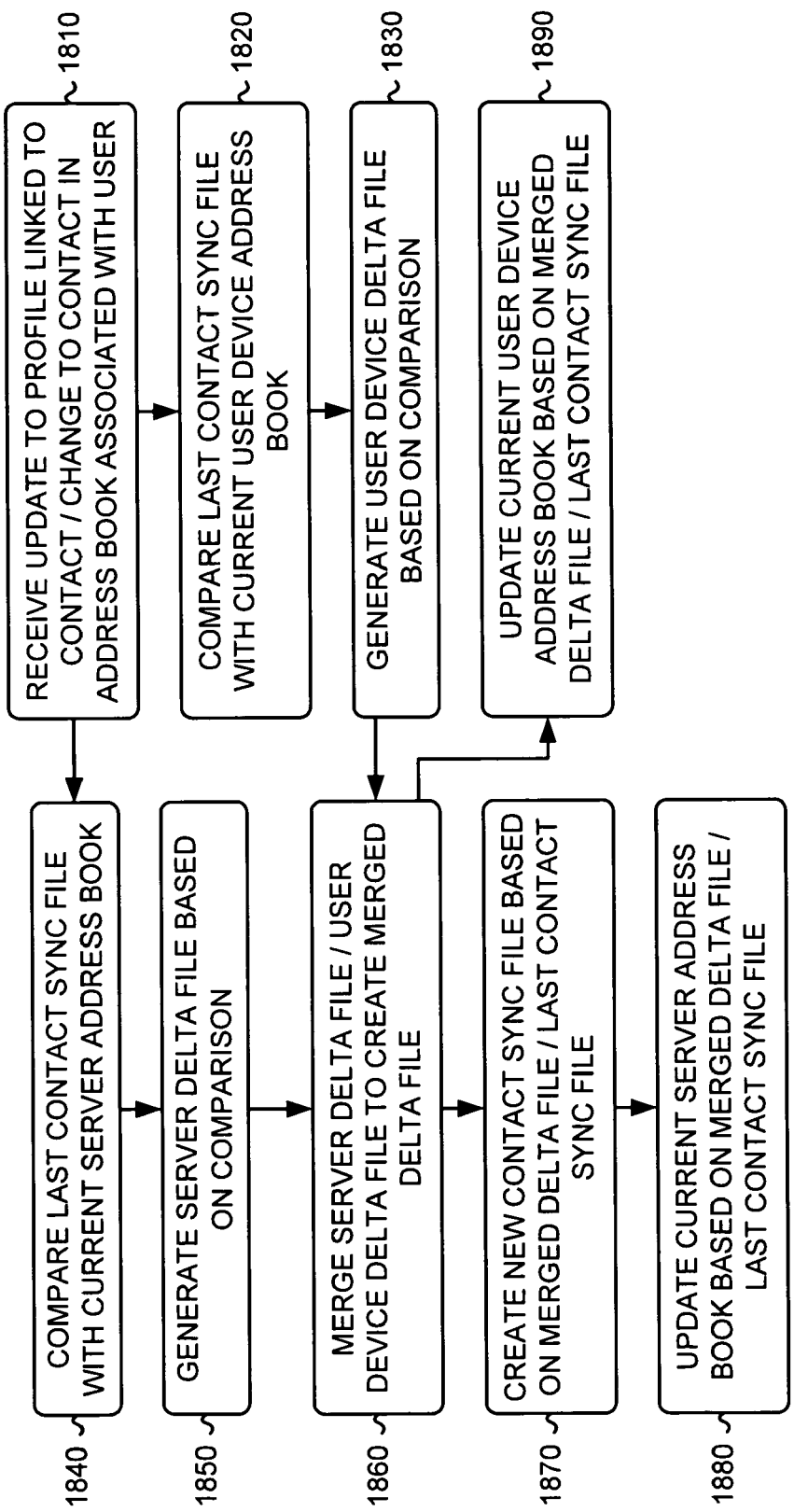

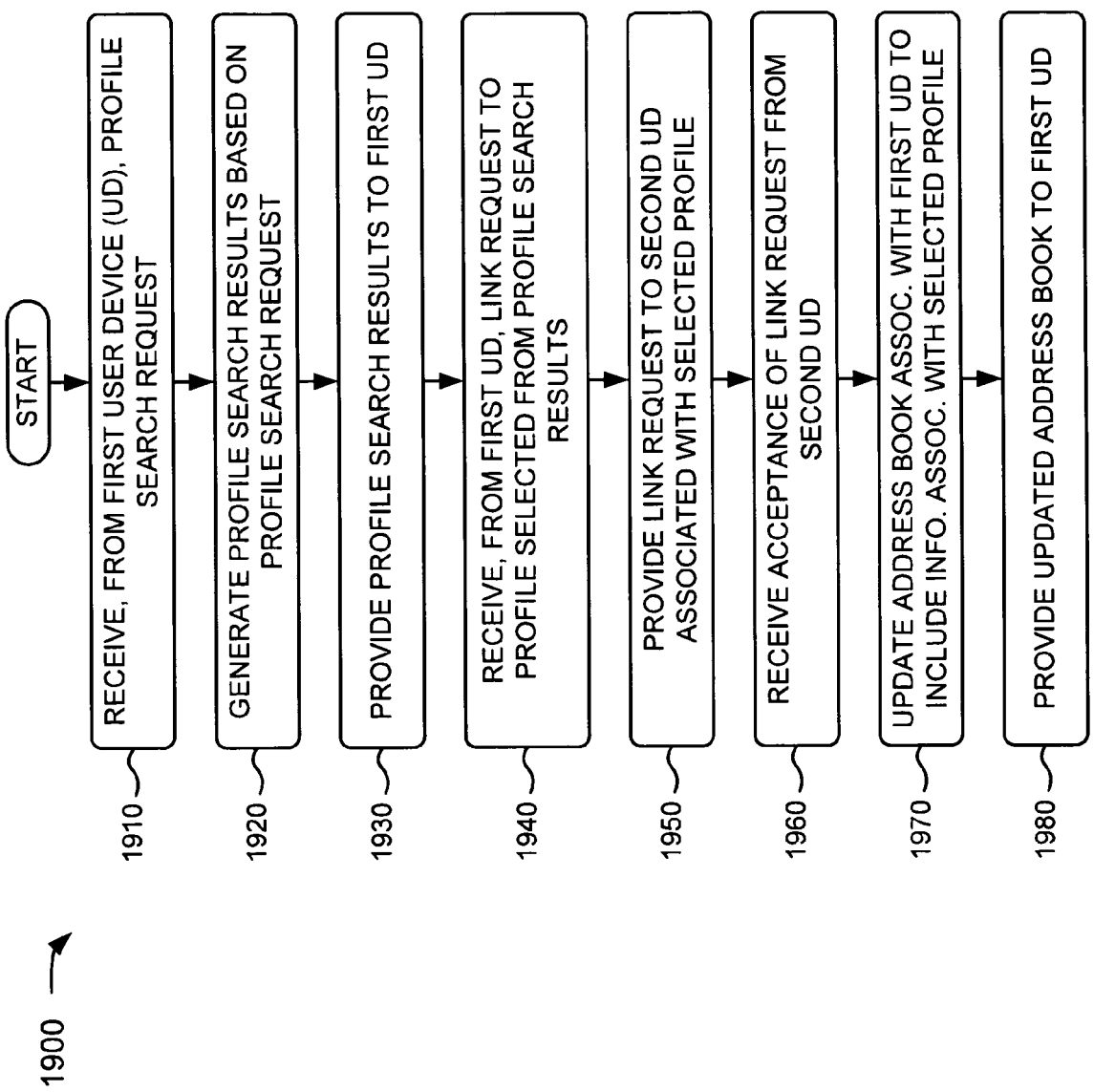

NETWORKED ADDRESS BOOK

RELATED APPLICATIONS

This application claims priority to U.S. Provisional Patent Application No. 61/013,549, filed Dec. 13, 2007, and U.S. Provisional Patent Application No. 61/018,044, filed Dec. 31, 2007, the disclosures of which are incorporated by reference herein in their entireties.

BACKGROUND

An electronic address book includes a list of data entries that store telephone numbers, email addresses, physical addresses, etc. for a user's contacts. An electronic profile is a collection of a user's information that may be broader than the data entries provided in an address book. For example, besides the information contained in an address book, a profile may also include preference information (e.g., a user's favorite music or movies), financial information (e.g., bank and/or credit account information), a birth date, passport information, etc. In general, a profile is private to one person and includes the information that the person wants store, while an address book is public and includes information that can be shared with others (e.g., friends, family, etc.). Some products allow a user to synchronize and backup an address book (e.g., associated with a user device) with a server. Furthermore, some products allow a user to create profiles and to link profiles between friends and family.

BRIEF DESCRIPTION OF THE DRAWINGS

FIG. 5 depicts a diagram of a portion of an exemplary database capable of being provided in and/or managed by the server of the network illustrated in FIG. 1;

FIG. 6 illustrates a diagram of a portion of a profile table of the exemplary database depicted in FIG. 5;

FIG. 7 depicts a diagram of a portion of an address book contact table of the exemplary database illustrated in FIG. 5;

FIG. 8 illustrates a diagram of a portion of a link table of the exemplary database depicted in FIG. 5;

FIGS. 12A-12E illustrate diagrams of exemplary user interfaces capable of being generated by the user devices and/or the server of the network depicted in FIG. 1 during a profile/address book contact update operation and a synchronization operation;

FIG. 13 depicts a diagram of a profile search and link request operation capable of being performed by an exemplary portion of the network illustrated in FIG. 1;

FIGS. 14A-14E illustrate diagrams of exemplary user interfaces capable of being generated by the user devices and/or the server of the network depicted in FIG. 1 during a profile search and link request operation; and FIGS. 15-19 depict flow charts of exemplary processes according to implementations described herein.

DETAILED DESCRIPTION OF PREFERRED EMBODIMENTS

Figure 1:
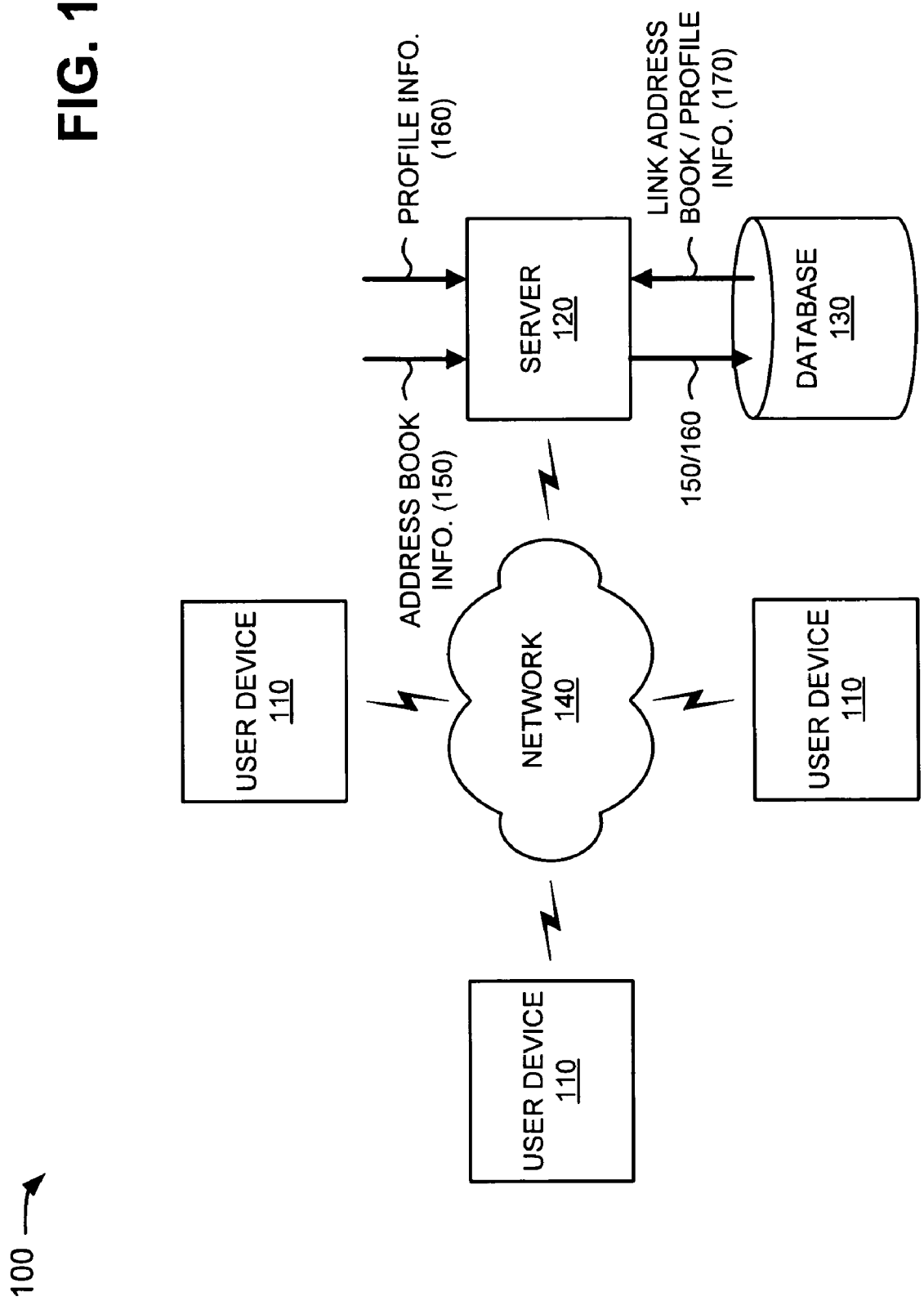
FIG. 1 depicts a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may enable a user to manage aspects of an address book (e.g., an electronic address book), and profiles (e.g., electronic profiles) linked to the address book, from a variety of user devices (e.g., a cell phone, a personal digital assistant (PDA), a television, an Internet-based device, etc.). In one implementation, for example, the systems and/or methods may receive one or more contacts in an address book associated with a user, and may receive profile information associated with one or more other users. The systems and/or methods may link the profile information with one or more corresponding contacts in the address book, and may provide the address book with the linked profile information to one or more user devices associated with the user.

An "address book," as the term is used herein, is to be broadly construed to include, for example, an electronic address book that includes a list of contacts, where each contact may include predefined fields (e.g., a home telephone number, a cell phone number, address information, etc.).

A "profile," as the term is used herein, is to be broadly construed to include, for example, information that describes a user, such as, contact information, personal information, professional information, personal preferences, collections of favorite music, movies, or pictures, etc.

A "connected address book," a "networked address book," or a "linked address book," as the terms are used herein, are to be broadly construed to include, for example, an address book that includes contacts and profiles connected/linked to corresponding contacts. In one example, if a profile is updated, contact information associated with the updated profile may be automatically updated (e.g., via a synchronization operation) to include the updated profile information. The address book may be "connected" since address books on multiple user devices (e.g., a cell phone, a PDA, a laptop computer, etc.) associated with a user may be connected. For example, the address books on the multiple user devices may be connected such that a change in an address book on one of the user devices may be reflected in the address books on the other user devices. The address book may be "networked" since address book users may be networked through the address book and profile sharing and social networking. Furthermore, one user's address book may be networked among multiple user devices associated with the user. A permanent copy of the user's address book may be stored on a network device (e.g., a server) so that if the user changes a user device, the user may obtain the address book from the network device.

As used herein, the terms "user" and "owner" are intended to be broadly interpreted to include a user device or a user and/or owner of a user device.

FIG. 1 is a diagram of an exemplary network 100 in which systems and/or methods described herein may be implemented. As illustrated, network 100 may include one or more user devices 110, a server 120, and a database 130 interconnected by a network 140. Components of network 100 may interconnect via wired and/or wireless connections. Three user devices 110, a single server 120, a single database 130, and a single network 140 have been illustrated in FIG. 1 for simplicity. In practice, there may be more or less user devices 110, and more servers 120, databases 130, and/or networks 140. Also, in some instances, one or more of the components of network 100 may perform one or more functions described as being performed by another one or more of the components of network 100.

Each of user devices 110 may include any device that is capable of accessing server 120 via network 140. For example, each of user devices 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or other types of computation or communication devices, threads or processes running on these devices, and/or objects executable by these devices. Each of user devices 110 may enable a user to change the user's profile, to perform a search for other user profiles, to link to other user profiles, to store a local address book, to synchronize the local address book with a networked address book stored by server 120 (e.g., in database 130).

Server 120 may include one or more server entities, or other types of computation or communication devices, that gather, process, search, and/or provide information in a manner described herein. In one implementation, server 120 may securely (e.g., via user authentication) retrieve a profile for a user associated with one of user devices 110, may provide the profile to user device 110, may receive modifications and/or changes to the profile from user device 110, and may store the changes/modifications in database 130. In another implementation, server 120 may search a profile database (e.g., provided in database 130) based on a profile search request (e.g., that includes a user name, email address, location, telephone number, etc.) received from one of user devices 110, and may return profile search results with limited information based on the profile search request.

In still another implementation, server 120 may receive, from one of user devices 110, a request to link an address book contact entry with a profile (e.g., that may be returned with the profile search results), and may provide the link request (e.g., via an email or a Short Message Service (SMS) text message) to one or more user devices 110 associated with the requested profile's user. If the requested profile's user accepts the link request, server 120 may link the profile with the contact of the address book associated with the user generating the link request.

In a further implementation, server 120 may store a server address book (e.g., in database 130) for each user associated with one or more user devices 110. If a profile (e.g., provided in the profile database) is changed or updated, server 120 may update all address book entries that include a link to the updated profile. Server 120 may synchronize the server address books with the local address books provided on corresponding user devices 110. If a local address book provided on one user device 110 is updated, server 120 may update a server address book associated with the local address book, and may synchronize the updated server address book with local address books provided on other user devices 110. For example, if a user, via a cell phone, updates the local address book provided on the cell phone, server 120 may update a server address book associated with the cell phone's local address book, and may synchronize the updated server address book with a local address book provided on a personal computer associated with the user. Such an arrangement may ensure that an address book associated with a user is updated and synchronized for each of user devices 110 associated with the user.

Database 130 may include a storage device that may store information received by server 120. In one implementation, database 130 may store information described below in connection with, for example, a database portion 500 (FIG. 5). For example, database 130 may store a profile table, an address book contact table, a link table, etc. Although FIG. 1 shows database 130 as separate from server 120, in other implementations, database 130 may be incorporated in server 120.

Network 140 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

In one exemplary implementation, as further shown in FIG. 1, server 120 may receive address book information 150 and profile information 160, and may provide address book information 150 and profile information 160 to database 130. Address book information 150 may include address books (and corresponding contacts) of one or more users associated with one or more user devices 110. Profile information 160 may include profiles of one or more users associated with one or more user devices 110. Server 120 (e.g., via coordination with database 130) may link profile information 160 with one or more corresponding contacts provided in one or more address books (e.g., provided via address book information 150), as shown by reference number 170. Server 120 may provide the address books with the linked profile information to one or more user devices 110 associated with the one or more users.

Figure 2:
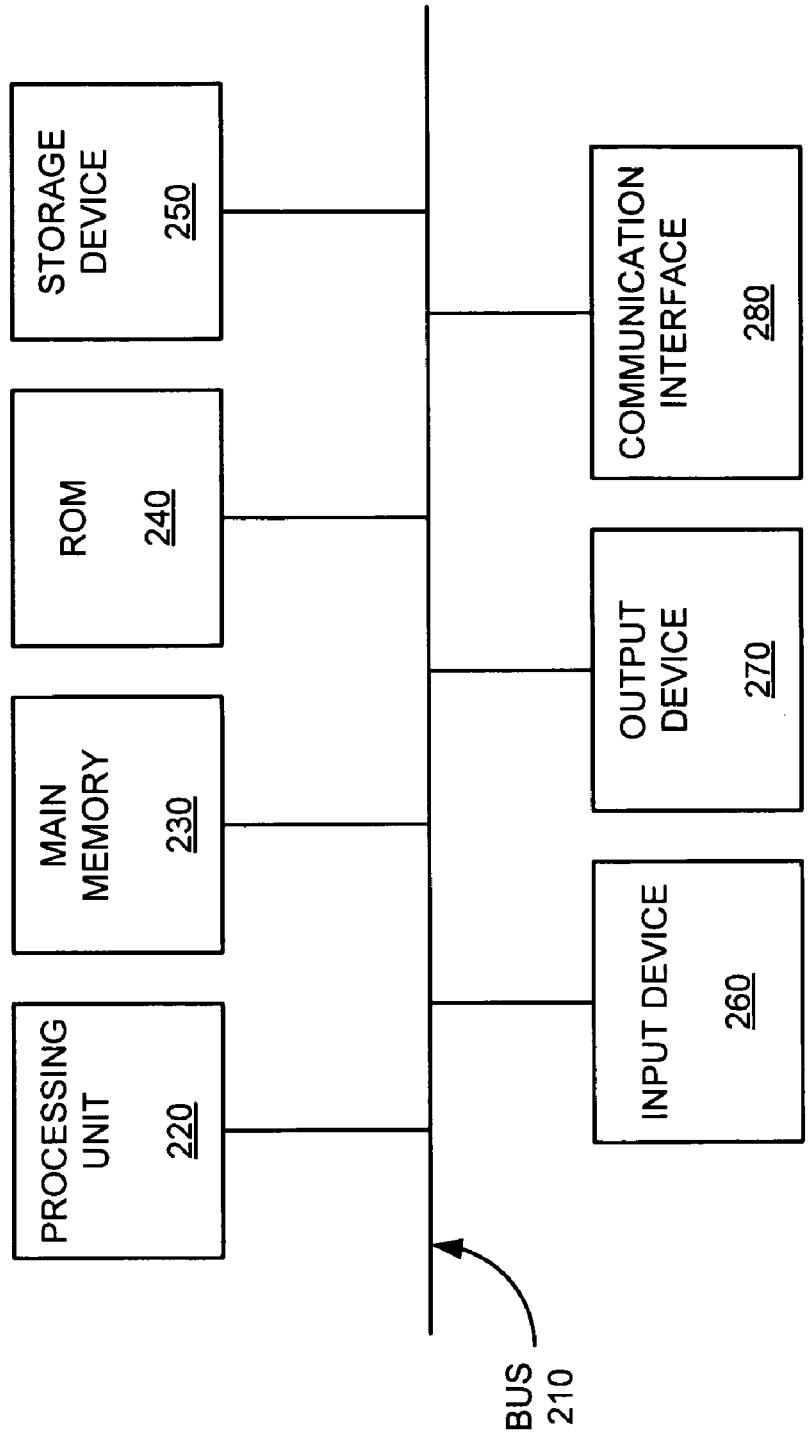
FIG. 2 illustrates exemplary components of a server of the network depicted in FIG. 1.

FIG. 2 is an exemplary diagram of a device 200 that may correspond to server 120. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include a processor, microprocessor, or other type of processing unit that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 140.

As described herein, device 200 may perform certain operations in response to processing unit 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
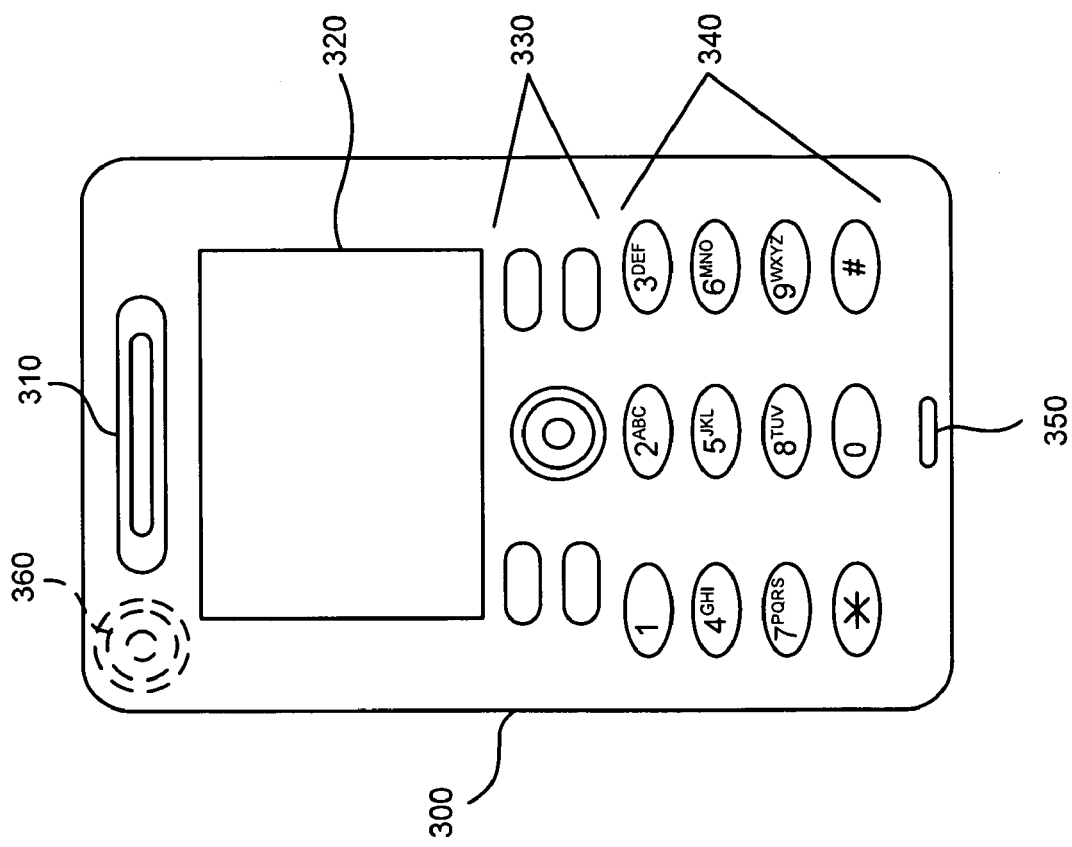
FIG. 3 depicts a diagram of an exemplary user device of the network illustrated in FIG. 1.

FIG. 3 depicts a diagram of an exemplary one of user devices 110. As illustrated, user device 110 may include a housing 300, a speaker 310, a display 320, control buttons 330, a keypad 340, a microphone 350, and/or a camera 360. Housing 300 may protect the components of user device 110 from outside elements. Speaker 310 may provide audible information to a user of user device 110.

Display 320 may provide visual information to the user. For example, display 320 may display text input into user device 110, text, images, video, and/or graphics received from another device, and/or information regarding incoming or outgoing calls or text messages, emails, media, games, phone books, address books, the current time, etc. In one exemplary implementation, display 320 may act as a viewfinder that may aid user device 110 in capturing and/or storing video and/or images. Control buttons 330 may permit the user to interact with user device 110 to cause user device 110 to perform one or more operations. For example, control buttons 330 may be used to cause user device 110 to transmit information. Keypad 340 may include a standard telephone keypad. Microphone 350 may receive audible information from the user. Camera 360 may be provided on a back side of user device 110, and may enable user device 110 to capture and/or store video and/or images (e.g., pictures).

Although FIG. 3 shows exemplary components of user device 110, in other implementations, user device 110 may contain fewer, different, or additional components than depicted in FIG. 3. In still other implementations, one or more components of user device 110 may perform one or more other tasks described as being performed by one or more other components of user device 110.

Figure 4:
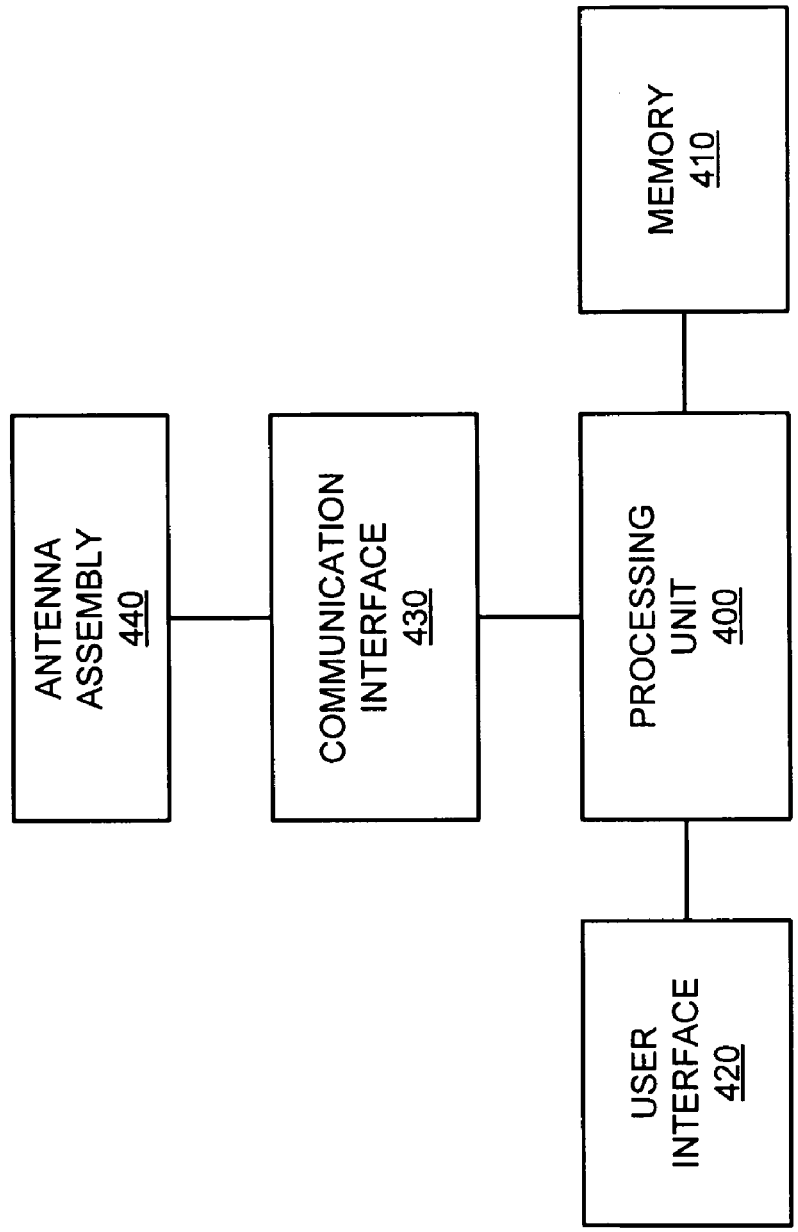
FIG. 4 illustrates a diagram of exemplary components of the user device depicted in FIG. 3.

FIG. 4 is a diagram of exemplary components of user device 110. As illustrated, user device 110 may include processing unit 400, memory 410, a user interface 420, a communication interface 430, and/or an antenna assembly 440.

Processing unit 400 may include a processor, a microprocessor, an application specific integrated circuit (ASIC), a field programmable gate array (FPGA), or the like. Processing unit 400 may control operation of user device 110 and its components. In one implementation, processing unit 400 may control operation of components of user device 110 in a manner described herein.

Memory 410 may include a random access memory (RAM), a read-only memory (ROM), and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); a vibrator to cause user device 110 to vibrate; and/or a camera (e.g., camera 360) to receive video and/or images.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 140).

As will be described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows exemplary components of user device 110, in other implementations, user device 110 may contain fewer, different, or additional components than depicted in FIG. 4. In still other implementations, one or more components of user device 110 may perform one or more other tasks described as being performed by one or more other components of user device 110.

FIG. 5 depicts a diagram of a portion of an exemplary database 500 capable of being provided in and/or managed by server 120. In one example, database portion 500 may be provided in database 130, and may be managed by server 120. As illustrated in FIG. 5, database portion 500 may include a variety of information associated with users of user devices 110. For example, database portion 500 may include a profile table 510, an address book contact table 520, and/or a link table 530.

Profile table 510 may include a table or a database that includes profile data fields for user profiles. In one exemplary implementation, each user may have a profile stored in profile table 510, and each user profile may be considered a single data record (or entry) in profile table 510. Profile table 510 may provide a secure repository for user profiles, and may be accessible by a user (e.g., via an authentication mechanism). In one implementation, profile table 510 may include a repository of telephone customers, wireless customers, cable television customers, Internet customers, etc. Further details of profile table 510 are provided below in connection with, for example, FIG. 6.

Address book contact table 520 may include a table or a database that includes data fields for contacts provided in address books. In one exemplary implementation, each address book contact may be considered a single data record (entry) in address book contact table 520. If a user's address book includes multiple contacts, the user's address book may correspond to multiple data records in address book contact table 520. One or more of the contacts provided in address book contact table 520 may or may not be linked with a profile provided in profile table 510. If a contact provided in address book contact table 520 is not linked to a profile, such a contact may be considered an ordinary address book entry that may be manipulated by a user. Further details of address book contact table 520 are provided below in connection with, for example, FIG. 7.

Link table 530 may include a table or a database that includes information linking a data record provided in profile table 510 and a data record provided in address book contact table 520. In one exemplary implementation, link table 530 may include a status data field that provides status information associated with links provided between data records provided in profile table 510 and data records provided in address book contact table 520. For example, the status data field may include information such as linked, pending, or disconnected. A "linked" status data field may indicate that corresponding profile and address book contact data records are linked. A "pending" status data field may indicate that a link between corresponding profile and address book contact data records is awaiting approval of a profile owner. A "disconnected" status data field may indicate that a link between corresponding profile and address book contact data records is disconnected. In one implementation, if a link is established (e.g., via link table 530), the link may occur from an address book contact data record to a profile data record. For example, a first user may include a contact in his/her address book that is linked to a second user's profile, while the second user may not include a contact in his/her address book that is linked to the first user's profile. Such an arrangement is different than a profile to profile link. Further details of link table 530 are provided below in connection with, for example, FIG. 8.

Although FIG. 5 shows exemplary information that may be provided in database portion 500, in other implementations, database portion 500 may contain less, different, or additional information than depicted in FIG. 5.

FIG. 6 illustrates a diagram of a portion of profile table 510 according to an exemplary implementation. As illustrated, profile table 510 may include a variety of information associated with user profiles. For example, profile table 510 may include profile information fields 600, identification fields 610, employment information fields 620, home information fields 630, a cell phone field 640, an email address field 650, personal preferences fields 660, a personal account information field 670, and/or a variety of entries 680 and 690 associated with fields 600-670.

Profile information fields 600 may include information associated a profile, such as a profile identification (ID) field, a profile name field, a profile passcode field, etc. For example, the profile ID field may include an identification number (e.g., "001") for a profile, the profile name field may include a name (e.g., "Richard Smith") of a user associated with the profile, and the profile passcode field may include an encrypted passcode (or password) associated with accessing the profile.

Identification fields 610 may include identification information about a user associated with the profile, such as a last name field, a first name field, a title field, etc. For example, the last name field may include a last name (e.g., "Smith") of the user associated with the profile, the first name field may include a first name (e.g., "Richard") of the user, and the title field may include a title (e.g., "Doctor") of the user.

Employment information fields 620 may include employment information for a user associated with the profile, such as a work street field, a work city field, a work state field, a work phone field, a professional experiences field, etc. For example, the work street field may include a street name (e.g., "40 Sylvan Road") for the user's place of employment, the work city field may include a city name (e.g., "Waltham") for the user's place of employment, the work state field may include a state name (e.g., "Massachusetts") for the user's place of employment, the work phone field may include a telephone number (e.g., "781-111-1111") for the user's place of employment, and the professional experiences field may include a description of the user's professional experiences.

Home information fields 630 may include residence information for a user associated with a profile, such as a home street field, a home city field, a home state field, and a home phone field. For example, the home street field may include a street name (e.g., "33 Lexington Street") for the user's residence, the home city field may include a city name (e.g., "Newton") for the user's residence, the home state field may include a state name (e.g., "Massachusetts") for the user's residence, and the home phone field may include a telephone number (e.g., "555-555-5555") for the user's residence.

Cell phone field 640 may include a telephone number (e.g., "666-666-6666") for a cellular phone of a user associated with a profile. Email address field 650 may include an email address (e.g., "Richard.Smith@email.com") of a user associated with a profile.

Personal preferences fields 660 may include personal preference information for a user associated with a profile, such as a favorite movie field, a favorite sport field, a personal pictures field, and a personal videos field. For example, the favorite movie field may include a name (e.g., "Gone With The Wind") of the user's favorite movie, the favorite sport field may include a name (e.g., "football") of the user's favorite sport, the personal pictures field may include a list of the user's favorite pictures, and the personal videos field may include a list of the user's favorite videos.

Personal account information field 670 may include account information for a user associated with a profile. For example, personal account information field 670 may include login information, billing information, etc.

Although FIG. 6 shows exemplary information that may be provided in profile table 510, in other implementations, profile table 510 may contain less, different, or additional information than depicted in FIG. 6. For example, profile table 510 may include as much information as a user desires, and may store all digital information associated with a user.

FIG. 7 depicts a diagram of a portion of address book contact table 520 according to an exemplary implementation. As illustrated, address book contact table 520 may include a variety of information associated with an address book. For example, address book contact table 520 may include a contact record identification (ID) field 700, a contact owner identification (ID) field 705, a contact profile identification (ID) field 710, a connection status field 715, identification fields 720, employment information fields 725, home information fields 730, cell phone fields 735, email address fields 740, and/or a variety of entries 745 and 750 associated with fields 700-740.

Contact record ID field 700 may include identification information of a contact record associated with an address book. For example, contact record ID field 700 may include an identification number (e.g., "001") for a contact record. Contact owner ID field 705 may include identification information of a contact owner associated with an address book. For example, contact owner ID field 705 may include an identification number (e.g., "002") for a contact owner.

Contact profile ID field 710 may include identification information of a contact profile associated with an address book. For example, contact profile ID field 710 may include an identification number (e.g., "001") for a contact profile.

Connection status field 715 may include information associated with links provided between a contact data record (e.g., contact record ID field 700) and a profile data record (e.g., contact profile ID 710). For example, connection status field 715 may include information, such as "none" (e.g., which may indicate that there is no link provided between the contact and profile data records), "pending" (e.g., which may indicate that a link provided between the contact and profile data records is pending approval), "connected" (e.g., which may indicate that there is a link provided between the contact and profile data records), "disconnected" (e.g., which may indicate that a link provided between the contact and profile data records has been removed), "profile removed" (e.g., which may indicate that the profile data record has been removed), and "contact removed" (e.g., which may indicate that the contact data record has been removed).

Identification fields 720 may include identification information about a contact associated with the address book, such as a last name field, a first name field, a title field, etc. For example, the last name field may include a last name (e.g., "Smith") of the contact, the first name field may include a first name (e.g., "Richard") of the contact, and the title field may include a title (e.g., "Doctor") of the contact.

Employment information fields 725 may include employment information for a contact associated with the address book, such as a work city field, a work phone field, etc. For example, the work city field may include a city name (e.g., "Waltham") for the contact's place of employment, and the work phone field may include a telephone number (e.g., "781-111-1111") for the contact's place of employment.

Home information fields 730 may include residence information for a contact associated with the address book, such as a home phone field, a home city field, etc. For example, the home phone field may include a telephone number (e.g., "555-555-5555") for the contact's residence, the home city field may include a city name (e.g., "Newton") for the contact's residence.

Cell phone fields 735 may include fields that provide cellular telephone numbers of a contact associated with the address book. For example, cell phone fields 735 may include a telephone number (e.g., "666-666-6666") for a first cellular phone of the contact, and a telephone number (e.g., "777-777-7777") for a second cellular phone of the contact. Email address fields 740 may include fields that provide email addresses of a contact associated with the address book. For example, email address fields 740 may include a first email address (e.g., "Richard.Smith@email.com") of the contact, and second email address (e.g., "rsmith@email.com") of the contact.

Although FIG. 7 shows exemplary information that may be provided in address book contact table 520, in other implementations, address book contact table 520 may contain less, different, or additional information than depicted in FIG. 7. For example, address book contact table 520 may include a subset of information (e.g., address-related fields) provided in profile table 510.

FIG. 8 illustrates a diagram of a portion of link table 530 according to an exemplary implementation. As illustrated, link table 530 may include a variety of information associated with links between profile data records and address book data records. For example, link table 530 may include a profile table record identification (ID) field 800, an address book contact table record identification (ID) field 810, a link status field 820, and/or a variety of entries 830 with fields 800-820.

Profile table record ID field 800 may include identification information of profile data records provided in profile table 510. For example, profile table record ID field 800 may include identification numbers (e.g., "001," "002," "003," etc.) for profile data records.

Address book contact table record ID field 810 may include identification information of contact data records provided in address book contact table 520. For example, address book contact table record ID field 810 may include identification numbers (e.g., "004," "005," "006," etc.) for contact data records.

Link status field 820 may include status information associated with links provided between data records provided in profile table 510 and data records provided in address book contact table 520. For example, link status field 820 may include information such as linked, pending, or disconnected. "Linked" may indicate that corresponding profile and address book contact data records are linked. "Pending" may indicate that a link between corresponding profile and address book contact data records is awaiting approval of a profile owner. "Disconnected" status data field may indicate that a link between corresponding profile and address book contact data records is disconnected.

Although FIG. 8 shows exemplary information that may be provided in link table 530, in other implementations, link table 530 may contain less, different, or additional information than depicted in FIG. 8.

Figure 9:
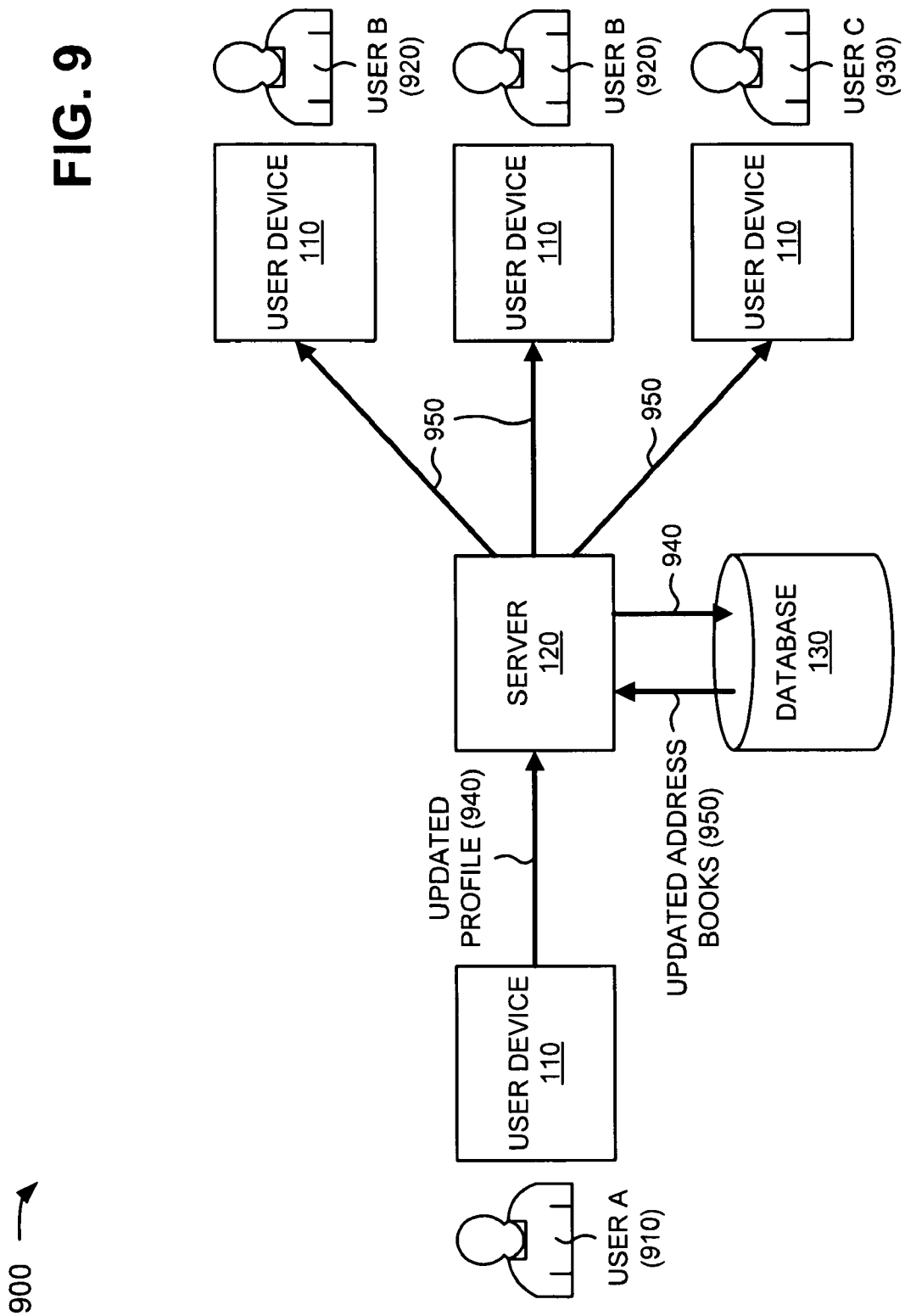
FIG. 9 depicts a diagram of a profile update operation capable of being performed by an exemplary portion of the network illustrated in FIG. 1.

FIG. 9 depicts a diagram of a profile update operation capable of being performed by an exemplary portion 900 of network 100. As illustrated, exemplary network portion 900 may include user devices 110, server 120, and database 130. User devices 110, server 120, and database 130 may include the features described above in connection with, for example, FIG. 1. User A (910) may be associated with one user device 110, user B (920) may be associated with two user devices 110, and user C (930) may be associated with one user device 110.

As further shown in FIG. 9, user A (910) may update his/her profile via user device 110. User A (910) may provide (e.g., via user device 110) updated profile 940 to server 120, and server 120 may receive updated profile 940 from user device 110. Updated profile 940 may include updates (or changes) to information that describes user A (910). For example, updated profile 940 may include updates (or changes) to contact information, personal information, professional information, personal preferences, collections of favorite music, movies, or pictures, etc. associated with user A (910). Updated profile 940 may be linked to one or more contacts provided in address books associated with other users (e.g., user B (920)).

Server 120 may use updated profile 940 to update user A's (910) profile, which may be stored in database 130 (e.g., in profile table 510). Updated profile 940 may cause server 120 to synchronize address books (e.g., provided in address book contact table 520) that include a contact linked to user A's (910) profile. Via synchronization, server 120 may update the contacts in such address books (e.g., as shown by reference number 950) to reflect the update made to user A's (910) profile. For example, if user A (910) provides a new home address (e.g., via updated profile 940), server 120 may update contacts in address books linked to user A's (910) profile to include the new home address for user A (910). Server 120 may provide one updated address book 950 (e.g., associated with user B (920)) to the two user devices 110 associated with user B (920), and may provide another updated address book 950 (e.g., associated with user C (930)) to user device 110 associated with user C (930). Two user devices 110 (e.g., a cell phone and a laptop computer) may be associated with user B (920), and updated address book 950 provided to the two user devices 110 may be the same. Such an arrangement may ensure that user B (920) receives the same updated address book 950 no matter which of the two user devices 110 is being utilized by user B (920).

By connecting contacts in address books to corresponding profiles, contact information may be automatically updated (e.g., by server 120) if a profile changes. In one exemplary implementation, user B (920) may include a contact in his/her address book that is linked to a profile associated with user A (910), while user A (910) may not include a contact in his/her address that is linked to a profile associated with user B (920). Such an arrangement may provide freedom in connecting address book contact table 520 to profile table 510. In other words, unlike linked profiles, user B (920) may have the option of linking to user A's (910) profile, but may not share his/her profile with user A's (910) address book. For example, server 120 may permit users to link their address books to an advertiser's profile, but may prevent the advertiser's address book from linking to the users' profiles.

Although FIG. 9 shows exemplary components of network portion 900, in other implementations, network portion 900 may contain fewer, different, or additional components than depicted in FIG. 9. In still other implementations, one or more components of network portion 900 may perform one or more other tasks described as being performed by one or more other components of network portion 900.

Figure 10:
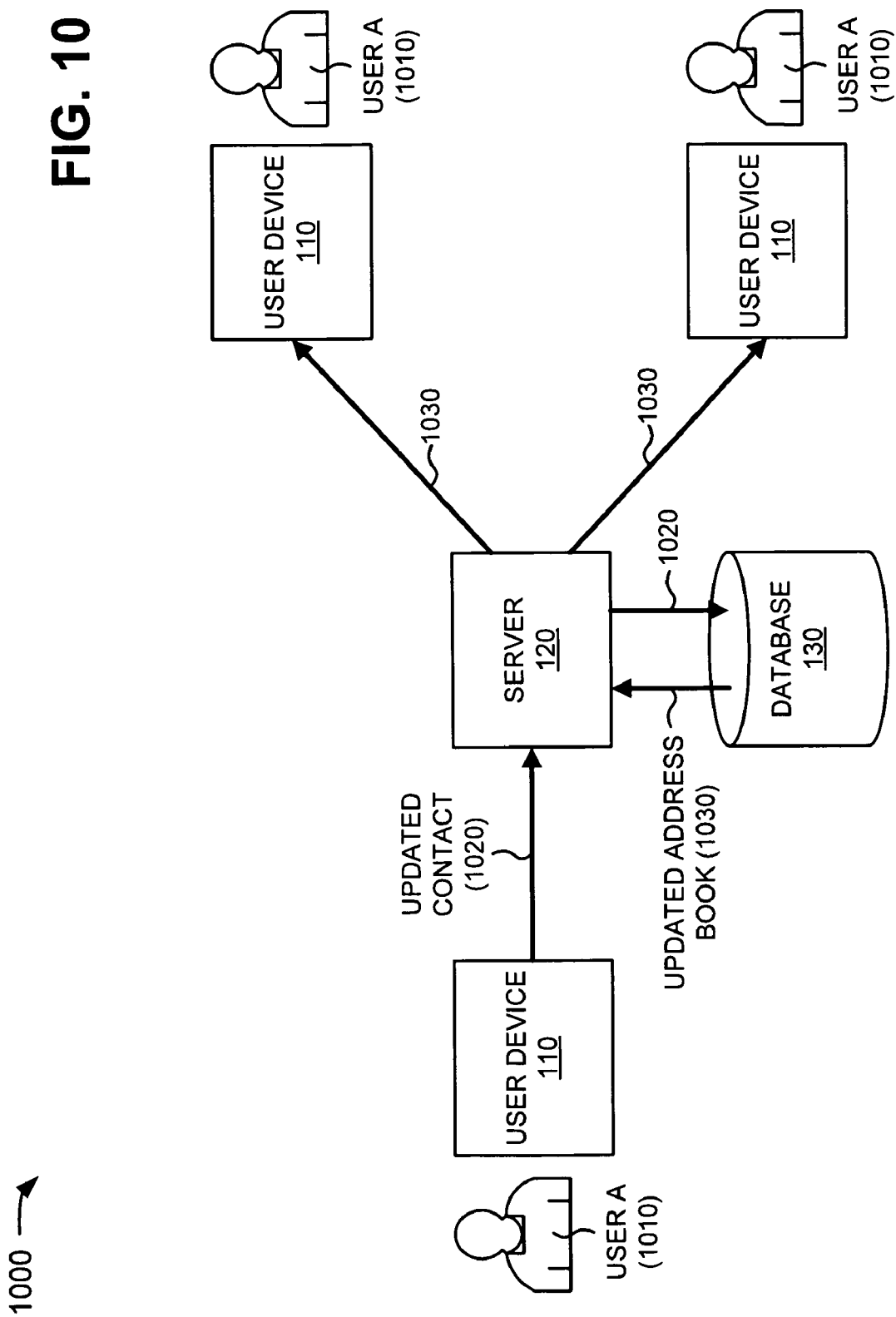
FIG. 10 illustrates a diagram of a contact update operation capable of being performed by an exemplary portion of the network depicted in FIG. 1.

FIG. 10 illustrates a diagram of a contact update operation capable of being performed by an exemplary portion 1000 of network 100. As illustrated, exemplary network portion 1000 may include user devices 110, server 120, and database 130. User devices 110, server 120, and database 130 may include the features described above in connection with, for example, FIG. 1. User A (1010) may be associated with three different user devices 110. For example, user A may be associated with a cell phone, a laptop computer, and a PDA as the three different user devices 110. User A (1010) may also be associated with an address book stored by server 120 in database 130.

Because the address book is stored in database 130, user A (1010) may access the address book via any of the three different user devices 110, and the address book may include the same information for each of the three different user devices 110. Synchronization by server 120 may permit user A (1010) to synchronize local address books stored in the three different user devices 110 with the address book stored in database 130. Such an arrangement may prevent the local address books stored in the three different user devices 110 from being out of sync. If one of the three different user devices 110 are lost, user A (1010) may not lose his/her address book since user A's (1010) address book may be stored in database 130. As shown in FIG. 10, user A (1010) may update (e.g., via a first user device 110) a contact provided in an address book stored in the first user device 110, and may provide updated contact 1020 to server 120. Server 120 may receive updated contact 1020 from the first user device 110. Updated contact 1020 may include updates (or changes) to information that describes a contact of the address book stored in the first user device 110. For example, updated contact 1020 may include updates (or changes) to a name, a title, employment information, cell phones, email addresses, etc. associated with a contact of the address book stored in first user device 110.

Server 120 may use updated contact 1020 to update an address book associated with user A (1010), which may be stored in database 130 (e.g., in address book contact table 520). Updated contact 1020 may cause server 120 to initiate a synchronization operation. Via synchronization, server 120 may update the contact in the address book stored in database 130 (e.g., as shown by reference number 1030) to reflect the update made to the contact via the first user device 110. For example, if user A (910) provides a new home city for a contact (e.g., via updated contact 1020), server 120 may update the contacts in the address book stored in database 130 to include the new home city for the contact. Server 120 may provide updated address book 1030 (e.g., associated with user A (1010)) to the two other user devices 110 associated with user A (1010). For example, the two other user devices 110 (e.g., a laptop computer and a PDA) may be associated with user A (1010), and updated address book 1030 provided to the two other user devices 110 may be the same (e.g., may include the updated contact information). Such an arrangement may ensure that user A (1010) receives the same updated address book 1030 no matter which of the three user devices 110 is being utilized by user A (1010).

Although FIG. 10 shows exemplary components of network portion 1000, in other implementations, network portion 1000 may contain fewer, different, or additional components than depicted in FIG. 10. In still other implementations, one or more components of network portion 1000 may perform one or more other tasks described as being performed by one or more other components of network portion 1000.

Figure 11:
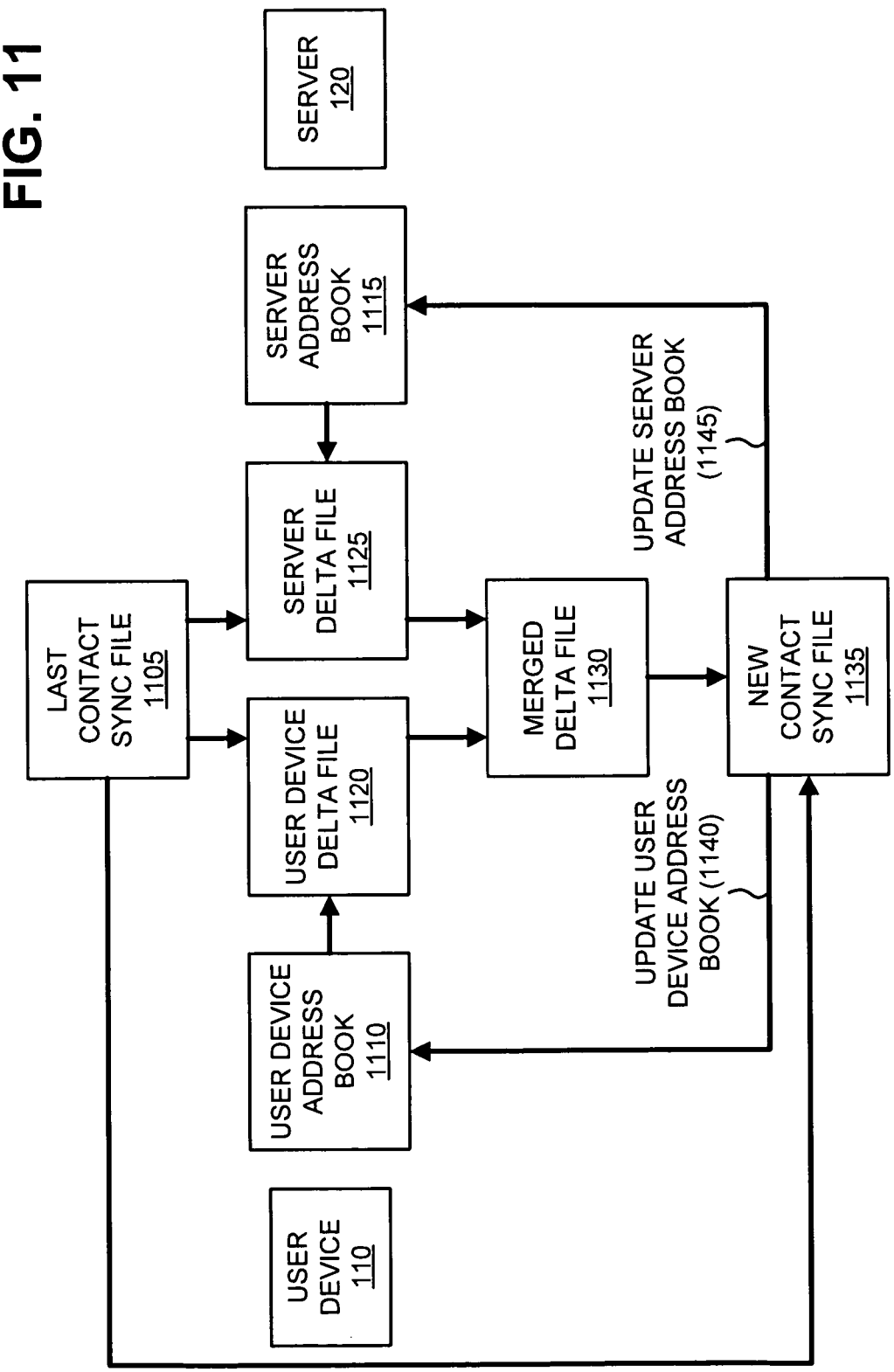
FIG. 11 depicts a diagram of an address book synchronization operation capable of being performed by an exemplary portion of the network illustrated in FIG. 1.

FIG. 11 depicts a diagram of an address book synchronization operation capable of being performed by an exemplary portion 1100 of network 100. As illustrated, exemplary network portion 1100 may include user device 110 and server 120. User device 110 and server 120 may include the features described above in connection with, for example, FIG. 1.

An address book synchronization operation may be triggered by updates, such as an update to profiles connected to the address book (e.g., updated profile 940, FIG. 9), and an update to a contact in the address book from one access point (e.g., updated contact 1020, FIG. 10). FIG. 11 depicts how an address book synchronization operation may be implemented between user device 110 and server 120. User device 110 and server 120 may each store a last contact synchronization (sync) file 1105 for a last synchronization associated with user device 110. Last contact sync file 1105 may include user device's 110 local address book with two additional entries for each data record (e.g., a server record ID entry and a user device record ID entry). For an initial state, last contact sync file 1105 may be empty. User device 110 may store a user device address book 1110, and server 120 may store a server address book 1115.

If user device address book 1110 includes changes (e.g., additions, deletions, modifications, etc.) and/or server address book 1115 includes changes, the address book synchronization operation may be initiated by user device 110. In the synchronization operation, user device 110 may compare last contact sync file 1105 with user device address book 1110, on a record by record basis, to produce a user device delta file 1120. In one exemplary implementation, user device delta file 1120 may be provided in an extensible markup language (XML) format. If a record in user device address book 1110 is not included in last contact sync file 1105, the record may be considered a new record and an add operation may be performed by user device 110. Exemplary syntax for an add operation may include the following:

```
<Add>
    <LastName> Smith </LastName>
    <FirstName> Jack <FirstName>
    <CellPhone1> 6172859627 </CellPhone1>
    <Email1> jack.smith@email.com </Email1>
</Add>.
```

If a record in last contact sync file 1105 is not included in user device address book 1110, a delete operation may be performed by user device 110. Exemplary syntax for a delete operation may include the following:

```
<Delete>
    <ServerContactRecordID> 1111 <\ ServerContactRecordID>
    <DeviceContactRecordID> 112 <\DeviceContactRecordID>
</Delete>.
```

If there is a change to a record in user device address book 1110, an update operation may be performed by user device 110. Exemplary syntax for an update operation may include the following:

```
<Update>
    <ServerContactRecordID> 1111 <\ ServerContactRecordID>
    <DeviceContactRecordID> 112 <\DeviceContactRecordID>
    <FirstName> Jack </FirstName>
    <CellPhone1> 6172859628 </CellPhone1>
    <Email1> jack.smith@email.com </Email1>
</Update>.
```

Server 120 may compare last contact sync file 1105 with server address book 1115, on a record by record basis, to produce a server delta file 1125. In one exemplary implementation, server delta file 1125 may be provided in an XML format. Similar operations (e.g., an add operation, a delete operation, an update operation, etc.) may be performed by server 120, as may be performed by user device 110 (described above), to generate server delta file 1125.

Server 120 may merge user device delta file 1120 and server delta file 1125 to produce a merged delta file 1130. For records of user device delta file 1120 and server delta file 1125 that are created via add operations, if a same record was added to both user device delta file 1120 and server delta file 1125, server 120 may merge the same records in merged data file 1130. If there is a conflict between the records added to user device delta file 1120 and server delta file 1125 (e.g., user device delta file 1120 may include a first name of "Jack," while server delta file 1125 may include a first name of "John"), server 120 may create two add records in merged delta file 1130, instead of merging the two conflicting records. At a later time, a user may be provided with an option to modify and/or delete one of the two add records. However, if the two conflicting records are very similar (e.g., user device delta file 1120 may include a first name of "Jack," while server delta file 1125 may include a first name initial of "J"), server 120 may provide a merged entry of "Jack" in merged delta file 1130 since "J" is an initial for "Jack." In one exemplary implementation, server 120 may compare text of the two conflicting records to determine if any letter(s) match, and may compare the results to a predetermined match threshold. If the predetermined match threshold is not met, server 120 may create two add records in merged delta file 1130.

The delete and update operations may apply to records already provided in user device address book 1110 and/or server address book 1115. Such records may include a user device record ID entry and/or a server record ID entry. For records of user device delta file 1120 and server delta file 1125 that are created via delete and update operations, server 120 may compare what is changed in user device delta file 1120 and server delta file 1125, and may merge the results. For records of user device delta file 1120 and server delta file 1125 that are created via delete operations, server 120 may delete the records from merged data file 1130. For records of user device delta file 1120 and server delta file 1125 that are created via update operations, if a record was updated the same way in both user device delta file 1120 and server delta file 1125, server 120 may merge the same records in merged data file 1130. However, if a record was updated differently in user device delta file 1120 and server delta file 1125, server 120 may compare text of the two conflicting records to determine if any letter(s) match, and may compare the results to a predetermined match threshold. If the predetermined match threshold is not met, server 120 may use the record updated in server delta file 1125 as the entry for merged data file 1130. Updated records in server delta file 1125 may be given priority over updated records in user device delta file 1120 because contacts provided in server address book 1115 may be updated via changes to profiles linked to the contacts provided in server address book 1115.

As further shown in FIG. 11, server 120 may use last contact sync file 1105 and merged delta file 1130 to generate a new contact sync file 1135. New contact sync file 1135 may include the information provided in last contact sync file 1105, as modified based on the information provided in merged delta file 1130. New contact sync file 1135 may be stored in user device 110 and/or server 120 for future synchronization operations. New contact sync file 1135 may be used to update user device address book 1110, as indicated by reference number 1140, so that user device address book 1110 includes the same entries as new contact sync file 1135. New contact sync file 1135 may be used to update server address book 1115, as indicated by reference number 1145, so that server address book 1115 includes the same entries as new contact sync file 1135.

Although FIG. 11 shows exemplary components of network portion 1100, in other implementations, network portion 1100 may contain fewer, different, or additional components than depicted in FIG. 11. In still other implementations, one or more components of network portion 1100 may perform one or more other tasks described as being performed by one or more other components of network portion 11100.

FIGS. 12A-12E illustrate diagrams of exemplary user interfaces capable of being generated by user devices 110 and/or server 120 during a profile/address book contact update operation and a synchronization operation. User interfaces depicted in FIGS. 12A-12E, and each of the user interfaces depicted in FIGS. 14A-14E and described below (collectively referred to as "the user interfaces"), may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 12A, a user interface 1200 may provide a home page for an address book (e.g., associated with user device 110) and may include a synchronize option, a search option, and an edit profile option. The synchronize option may permit a user to synchronize the user device address book with an address book associated with server 120. The search option may permit a user to search profiles provided in profile table 510. The edit profile option may permit a user to edit a profile (e.g., provided in profile table 510) associated with the user.

If the user selects the edit profile option, a user interface 1210 (FIG. 12B) may be displayed to the user. User interface 1210 may provide a variety of fields associated with the user's profile, and may enable the user to modify the fields. For example, as shown in FIG. 12B, a first name and a last name associated with the user's profile may be displayed. The user may change the first name (e.g., to "Harry"), may change the last name (e.g., to "Houdini"), and may select "Save." If "Save" is selected, user device 110 may provide the updated profile (e.g., updated profile 940) to server 120, and server 120 may save the updated profile.

Once the updated profile is saved, a user interface 1220 (FIG. 12C) may be displayed to the user and server 120 may begin synchronizing the updated profile with address books that include a link to the updated profile. Server 120 may perform synchronization of the address books at a scheduled time (e.g., daily), immediately after saving the updated profile, or at another time.

A user may update a contact in a local address book associated with user device 110, as described above in connection with FIG. 10. After updating a contact, the user may select the synchronize option of a user interface 1230 (e.g., a home page) depicted in FIG. 12D. Selection of the synchronize option may cause user device 110 to provide (e.g., automatically or at a predetermined time) the updated contact to server 120. Server 120 may receive the updated contact 120, and may update a corresponding address book stored by server 120 (e.g., in database 130). User interface 1240 (FIG. 12D) may be displayed to the user and server 120 may begin synchronizing the updated address book with other user devices 110 associated with the user. Server 120 may perform synchronization of the updated address books at a scheduled time (e.g., daily), immediately after updating the corresponding address book stored by server 120, or at another time.

Although user interfaces 1200-1240 depict a variety of information, in other implementations, user interfaces 1200-1240 may depict less, different, or additional information than depicted in FIGS. 12A-12E.

FIG. 13 depicts a diagram of a profile search and link request operation capable of being performed by an exemplary network portion 1300 of network 100. As illustrated, exemplary network portion 1300 may include user devices 110, server 120, profile table 510, address book contact table 520, and link table 530. User device 110, server 120, profile table 510, address book contact table 520, and link table 530 may include the features described above in connection with, for example, FIGS. 1 and 5-8. User A (1310) may be associated with one user device 110, and user B (1320) may be associated with another user device 110.

In one implementation, exemplary network portion 1300 may permit a user to search profile table 510 for profiles, and request to link the located profiles to the user's address book. The profiles provided by profile table 510 may be searchable by users associated with a network (e.g., network 100), but the users may only view limited information provided in profile table 510. This may prevent profile information from being exposed to telemarketers, spammers, etc. In one example, a profile owner may also prevent his/her profile from being searched. In another implementation, if the user adds a contact to his/her address book, server 120 may automatically search profile table 510 for a profile matching the added contact, and may inform the user if a match is found. In still another implementation, server 120 may periodically check for potentially matches between contacts and profiles since new contacts and/or profiles may be added to address book contact table 520 and/or profile table 510 over time.

As shown in FIG. 13, user A (1310) (e.g., via user device 110) may provide a profile search request 1330 to server 120. In one example, profile search request 1330 may include information associated with a profile (e.g., name, address, title, etc.). Server 120 may receive profile search request 1330, may execute a search of profile table 510 based on profile search request 1330, and may receive profile search results 1340 from profile table 510 based on the search. In one implementation, profile search results 1340 may include minimal information (e.g., name and location information) associated with the matching profiles in order to preserve the privacy of the profile owners. Server 120 may provide profile search results 1340 to user device 110 associated with user A (1310). User A (1310) (e.g., via user device 110) may receive profile search results 1340 and may choose to view details for a profile (e.g., associated with user B (1320)) to make sure it is an intended person.

User A (1310) (e.g., via user device 110) may generate a request 1350 to link the profile to a contact in an address book associated with user A (1310). Server 120 may receive link request 1350, and may provide link request 1350 to user device 110 associated with user B (1320). In another implementation, user A (1310) (e.g., via user device 110) may provide link request 1350 directly to user device 110 associated with user B (1320). In one example, link request 1350 may be provided to user device 110 associated with user B (1320) via a SMS message or via an email. User B (1320) (e.g., via user device 110) may receive link request 1350, and may be provided with the option to view user A's (1310) information before making a decision to accept or reject link request 1350. If user B (1320) (e.g., via user device 110) accepts link request 1350, an accept link request indicator 1360 may be provided from user device 110 associated with user B (1320) to server 120. Server 120 may receive accept link request indicator 1360, and may update a contact in an address book associated with user A (1310) to include the profile information associated with user B (1320). For example, as shown in FIG. 13, server 120 may update 1370 link table 530 to include a link from the profile information associated with user B (1320) (e.g., provided in profile table 510) to the contact in the address book associated with user A (1310) (e.g., provided in address book contact table 520). Via synchronization, server 120 may provide an updated address book 1380 (e.g., that includes the link to the profile associated with user B (1320)) from address book contact table 520 to user device 110 associated with user A (1310).

Although FIG. 13 shows exemplary components of network portion 1300, in other implementations, network portion 1300 may contain fewer, different, or additional components than depicted in FIG. 13. In still other implementations, one or more components of network portion 1300 may perform one or more other tasks described as being performed by one or more other components of network portion 1300.

FIGS. 14A-14E illustrate diagrams of exemplary user interfaces capable of being generated by user devices 110 and/or server 120 during a profile search and link request operation as described above in connection with FIG. 13.

As illustrated in FIG. 14A, a user interface 1400 may provide search results for profiles provided in profile table 510. For example, a user may search the profiles provided in profile table 510 by entering a keyword, a first name, a last name, etc., and user interface 1400 may provide a list of profile matches along with location information (e.g., cities) associated with the profile matches. The search of profile table 510 may be similar to a "411" call or a "find contact" search from the white pages. However, the user searching profile table 510 may need approval from the profile owner before information is revealed. In one exemplary implementation, the profile owner may permit automatic connection to his/her profile when profile search results include the profile owner's profile. In such a situation, the profile owner's contact information may be revealed to the searching party.

If the user selects a profile from the search results provided in user interface 1400, the user may choose to view details for the selected profile, as shown in a user interface 1410 depicted in FIG. 14B. Viewing the selected profile details may enable the user to make sure that the profile is associated with the intended person (e.g., "Harry Houdini").

If the user determines that he/she wants to link to the selected profile (e.g., "Harry Houdini"), the user may select "Invite," and a user interface 1420 as depicted in FIG. 14C may be provided. The user may select "OK" to generate a request (e.g., link request 1350) to link the profile to a contact in an address book associated with the user. The link request may be provided to user device 110 associated with the profile owner (e.g., "Harry Houdini").

As illustrate in FIG. 14D, the profile owner may be provided a user interface 1430 that informs the profile owner of the user's (e.g., "Joe Johnson") link request. The profile owner may be provided with the option of adding the user as a contact in his/her address book. As shown in FIG. 14E, the profile owner may choose to view details for the user ("Joe Johnson"), as shown in a user interface 1440 depicted in FIG. 14E. Viewing the user's details may aid the profile owner in determining whether to accept or reject the link request. User interface 1440 may provide the profile owner with the option of saving (e.g., "Save") the user as a contact in his/her address book and/or the option of inviting (e.g., "Invite") the user to link to the profile owner's address book.

If the profile owner accepts the link request (e.g., by selecting "OK" in FIG. 14D), server 120 may update a contact in an address book associated with the user (e.g., "Joe Johnson") to include the profile information associated with the profile owner (e.g., "Harry Houdini"). For example, server 120 may update link table 530 to include a link from the profile information associated with the profile owner (e.g., provided in profile table 510) to the contact in the address book associated with the user (e.g., provided in address book contact table 520). Via synchronization, server 120 may provide an updated address book (e.g., that includes the link to the profile associated with the profile owner) from address book contact table 520 to user device 110 associated with the user.

Although user interfaces 1400-1440 depict a variety of information, in other implementations, user interfaces 1400-1440 may depict fewer, different, or additional information than depicted in FIGS. 14A-14E.

In one exemplary implementation, if a new profile is created in profile table 510, server 120 may search address book contact table 520 for potential matches with the new profile. If a match is found, server 120 may notify the matching address book owner that a profile for a contact in his/her address book has been found. The matching address book owner may initiate a link request to the profile owner, as described above in connection with, for example, FIG. 13. If the profile is a public profile or contains public information, the link request may automatically connect the public profile information with the address book without the need for human intervention.

In another exemplary implementation, if a new contact with limited information (e.g., a missed call's telephone number) is added to a user's address book, server 120 may search profile table 510 based on the limited information (e.g., based on the telephone number). If a match is found, server 120 may notify the user that a profile matching the limited information has been found. The user may initiate a link request to the profile owner, as described above in connection with, for example, FIG. 13. If the profile is a public profile or contains public information, the link request may automatically connect the public profile information with the user's address book without the need for human intervention.

Figure 15:
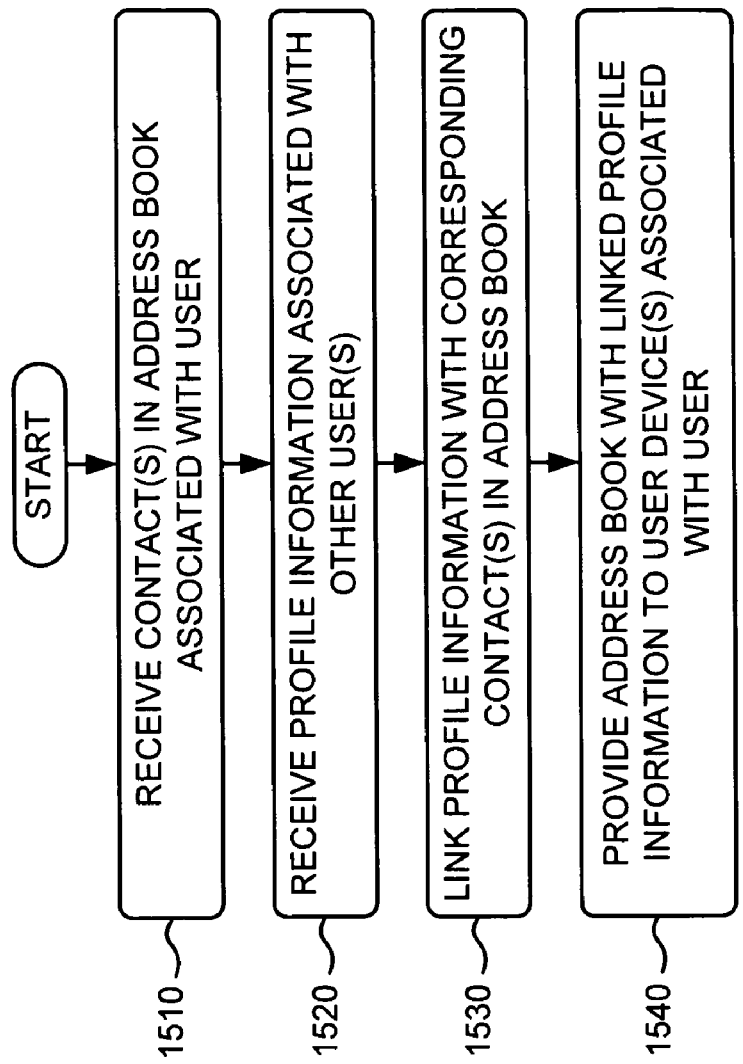

FIG. 15 depicts a flow chart of an exemplary process 1500 for linking profiles with corresponding contacts provided in address books according to implementations described herein. In one implementation, process 1500 may be performed by server 120. In another implementation, some or all of process 1500 may be performed by another device or group of devices, including or excluding server 120.

As illustrated in FIG. 15, process 1500 may begin with receipt of one or more contacts in an address book associated with a user (block 1510), and receipt of profile information associated with one or more other users (block 1520). For example, in implementations described above in connection with FIG. 1, server 120 may receive address book information 150 and profile information 160, and may provide address book information 150 and profile information 160 to database 130. Address book information 150 may include address books (and corresponding contacts) of one or more users associated with one or more user devices 110. Profile information 160 may include profiles of one or more users associated with one or more user devices 110.

As further shown in FIG. 15, the profile information may be linked with one or more corresponding contacts provided in the address book (block 1530), and the address book, with the linked profile information, may be provided to one or more user devices associated with the user (block 1540). For example, in implementations described above in connection with FIG. 1, server 120 (e.g., via coordination with database 130) may link profile information 160 with one or more corresponding contacts provided in one or more address books (e.g., provided via address book information 150), as shown by reference number 170. Server 120 may provide the address books with the linked profile information to one or more user devices 110 associated with the one or more users.

Figure 16:
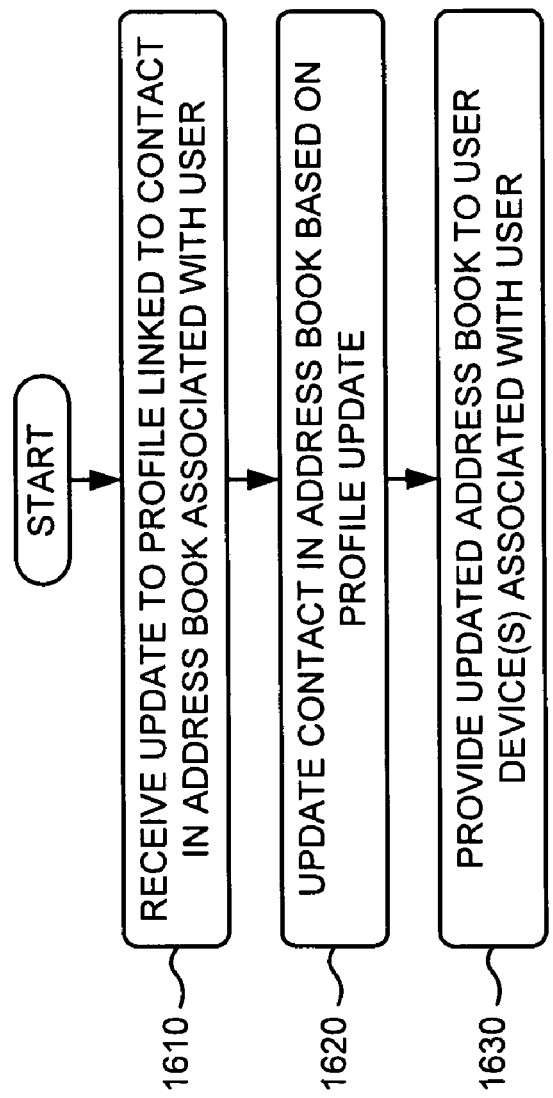

FIG. 16 illustrates a flow chart of an exemplary process 1600 for updating a profile linked to a corresponding contact provided in an address book according to implementations described herein. In one implementation, process 1600 may be performed by server 120. In another implementation, some or all of process 1600 may be performed by another device or group of devices, including or excluding server 120.

As illustrated in FIG. 16, process 1600 may begin with receipt of an update to a profile linked to a contact in an address book associated with a user (block 1610). For example, in implementations described above in connection with FIG. 9, user A (910) may update his/her profile via user device 110. User A (910) may provide (e.g., via user device 110) updated profile 940 to server 120, and server 120 may receive updated profile 940 from user device 110. Updated profile 940 may include updates (or changes) to information that describes user A (910). In one example, updated profile 940 may include updates (or changes) to contact information, personal information, professional information, personal preferences, collections of favorite music, movies, or pictures, etc. associated with user A (910). Updated profile 940 may be linked to one or more contacts provided in address books associated with other users (e.g., user B (920)).

As further shown in FIG. 16, the contact in the address book may be updated based on the profile update (block 1620), and the updated address book may be provided to one or more user devices associated with the user (block 1630). For example, in implementations described above in connection with FIG. 9, updated profile 940 may cause server 120 to synchronize address books (e.g., provided in address book contact table 520) that include a contact linked to user A's (910) profile. Via synchronization, server 120 may update the contacts in such address books (e.g., as shown by reference number 950) to reflect the update made to user A's (910) profile. Server 120 may provide the same updated address book 950 (e.g., associated with user B (920)) to the two user devices 110 associated with user B (920). Such an arrangement may ensure that user B (920) receives the same updated address book 950 no matter which of the two user devices 110 is being utilized by user B (920).

FIG. 17 illustrates a flow chart of an exemplary process 1700 for updating a profile linked to a corresponding contact provided in an address book according to implementations described herein. In one implementation, process 1700 may be performed by server 120. In another implementation, some or all of process 1700 may be performed by another device or group of devices, including or excluding server 120.

As illustrated in FIG. 17, process 1700 may begin with receipt, from a user device associated with a user, of a change to a contact in an address book associated with the user (block 1710). For example, in implementations described above in connection with FIG. 10, user A (1010) may update (e.g., via the first user device 110) a contact provided in an address book stored in the first user device 110, and may provide updated contact 1020 to server 120. Server 120 may receive updated contact 1020 from the first user device 110. Updated contact 1020 may include updates (or changes) to information that describes a contact of the address book stored in the first user device 110. In one example, updated contact 1020 may include updates (or changes) to a name, a title, employment information, cell phones, email addresses, etc. associated with a contact of the address book stored in first user device 110.

As further shown in FIG. 17, the contact in the address book may be updated based on the received change (block 1720), and the updated address book may be provided to one or more other user devices associated with the user (block 1730). For example, in implementations described above in connection with FIG. 10, server 120 may use updated contact 1020 to update an address book associated with user A (1010), which may be stored in database 130 (e.g., in address book contact table 520). Updated contact 1020 may cause server 120 to initiate a synchronization operation. Via synchronization, server 120 may update the contact in the address book stored in database 130 (e.g., as shown by reference number 1030) to reflect the update made to the contact via the first user device 110. Server 120 may provide the same updated address book 1030 (e.g., associated with user A (1010)) to the two other user devices 110 associated with user A (1010). Such an arrangement may ensure that user A (1010) receives the same updated address book 1030 no matter which of the three user devices 110 is being utilized by user A (1010).

FIG. 18 illustrates a flow chart of an exemplary process 1800 for synchronizing an address book with a user device according to implementations described herein. In one implementation, process 1800 may be performed by user device 110 and server 120. In another implementation, some or all of process 1800 may be performed by another device or group of devices, including or excluding user device 110 and/or server 120.

As illustrated in FIG. 18, process 1800 may begin with receipt, by a user device, of an update to a profile linked to a contact and/or a change to a contact provided in an address book associated with a user (block 1810), comparison, by the user device, of a last contact sync file with a current user device address book (block 1820), and generation, by the user device, of a user device delta file based on the comparison (block 1830). For example, in implementations described above in connection with FIG. 11, an address book synchronization operation may be triggered by updates, such as an update to profiles connected to the address book (e.g., updated profile 940, FIG. 9), and an update to a contact in the address book from one access point (e.g., updated contact 1020, FIG. 10). User device 110 and server 120 may each store last contact synchronization (sync) file 1105 for a last synchronization associated with user device 110. Last contact sync file 1105 may include user device's 110 local address book with two additional entries for each data record (e.g., a server record ID entry and a user device record ID entry). User device 110 may store user device address book 1110, and server 120 may store server address book 1115. If user device address book 1110 includes changes (e.g., additions, deletions, modifications, etc.) and/or server address book 1115 includes changes, the address book synchronization operation may be initiated by user device 110. In the synchronization operation, user device 110 may compare last contact sync file 1105 with user device address book 1110, on a record by record basis, to produce user device delta file 1120.

As further shown in FIG. 18, a server may compare (e.g., based on the profile update and/or the contact change—block 1810) the last contact sync file with a current server address book (block 1840), and may generate a server delta file based on the comparison (block 1850). For example, in implementations described above in connection with FIG. 11, server 120 may store server address book 1115. Server 120 may compare last contact sync file 1105 with server address book 1115, on a record by record basis, to produce server delta file 1125. Similar operations (e.g., an add operation, a delete operation, an update operation, etc.) may be performed by server 120, as may be performed by user device 110, to generate server delta file 1125.

Returning to FIG. 18, the server may merge the server delta file and the user device delta file to create a merged delta file (block 1860), may create a new contact sync file based on the merged delta file and the last contact sync file (block 1870), and may update the current server address book based on the merged delta file and the last contact sync file (block 1880).

For example, in implementations described above in connection with FIG. 11, server 120 may merge user device delta file 1120 and server delta file 1125 to produce merged delta file 1130. For records of user device delta file 1120 and server delta file 1125 that are created via add operations, if a same record was added to both user device delta file 1120 and server delta file 1125, server 120 may merge the same records in merged data file 1130. If there is a conflict between the records added to user device delta file 1120 and server delta file 1125, server 120 may create two add records in merged delta file 1130, instead of merging the two conflicting records. For records of user device delta file 1120 and server delta file 1125 that are created via delete and update operations, server 120 may compare what is changed in user device delta file 1120 and server delta file 1125, and may merge the results. Server 120 may use last contact sync file 1105 and merged delta file 1130 to generate new contact sync file 1135. New contact sync file 1135 may include the information provided in last contact sync file 1105 as modified based on the information provided in merged delta file 1130. New contact sync file 1135 may be used to update server address book 1115, as indicated by reference number 1145, so that server address book 1115 includes the same entries as new contact sync file 1135.

As further shown in FIG. 18, user device 110 may update the current user device address book based on the merged delta file and the last contact sync file (block 1890). For example, in implementations described above in connection with FIG. 11, new contact sync file 1135 may be stored in user device 110 and/or server 120 (e.g., in address book contact table 520) for future synchronization operations. New contact sync file 1135 may be used to update user device address book 1110, as indicated by reference number 1140, so that user device address book 1110 includes the same entries as new contact sync file 1135.

FIG. 19 illustrates a flow chart of an exemplary process 1900 for searching for and linking to a profile according to implementations described herein. In one implementation, process 1900 may be performed by server 120. In another implementation, some or all of process 1900 may be performed by another device or group of devices, including or excluding server 120.

As illustrated in FIG. 19, process 1900 may begin with receipt, from a first user device, of a profile search request (block 1910), generation of one or more profile search results based on the profile search request (block 1920), and providing the one or more profile search results to the first user device (block 1930). For example, in implementations described above in connection with FIG. 13, user A (1310) (e.g., via user device 110) may provide profile search request 1330 to server 120. In one example, profile search request 1330 may include information associated with a profile (e.g., name, address, title, etc.). Server 120 may receive profile search request 1330, may execute a search of profile table 510 based on profile search request 1330, and may receive profile search results 1340 from profile table 510 based on the search. In one example, profile search results 1340 may include minimal information (e.g., name and location information) associated with the matching profiles in order to preserve the privacy of the profile owners. Server 120 may provide profile search results 1340 to user device 110 associated with user A (1310). User A (1310) (e.g., via user device 110) may receive profile search results 1340 and may choose to view details for a profile (e.g., associated with user B (1320)) to make sure it is an intended person.

As further shown in FIG. 19, a link request to a profile selected from the profile search results may be received from the first user device (block 1940), the link request may be provided to a second user device associated with the selected profile (block 1950), and an acceptance of the link request may be received from the second user device (block 1960). For example, in implementations described above in connection with FIG. 13, user A (1310) (e.g., via user device 110) may generate request 1350 to link the profile to a contact in an address book associated with user A (1310). Server 120 may receive link request 1350, and may provide link request 1350 to user device 110 associated with user B (1320). In on example, user A (1310) (e.g., via user device 110) may provide link request 1350 directly to user device 110 associated with user B (1320). User B (1320) (e.g., via user device 110) may receive link request 1350, and may be provided the option to view user A's (1310) information before making a decision to accept or reject link request 1350. If user B (1320) (e.g., via user device 110) accepts link request 1350, an accept link request indicator 1360 may be provided from user device 110 associated with user B (1320) to server 120. Server 120 may receive accept link request indicator 1360.

Returning to FIG. 19, an address book associated with the first user device may be updated to include information associated with the selected profile (block 1970), and the updated address book may be provided to the first user device (block 1980). For example, in implementations described above in connection with FIG. 13, server 120 may update a contact in an address book associated with user A (1310) to include the profile information associated with user B (1320). In one example, server 120 may update 1370 link table 530 to include a link from the profile information associated with user B (1320) (e.g., provided in profile table 510) to the contact in the address book associated with user A (1310) (e.g., provided in address book contact table 520). Via synchronization, server 120 may provide updated address book 1380 (e.g., that includes the link to the profile associated with user B (1320)) from address book contact table 520 to user device 110 associated with user A (1310).

Systems and/or methods described herein may enable a user to manage aspects of an address book (e.g., an electronic address book), and profiles (e.g., electronic profiles) linked to the address book, from a variety of user devices (e.g., a cell phone, a personal digital assistant (PDA), a television, an Internet-based device, etc.). In one implementation, for example, the systems and/or methods may receive one or more contacts in an address book associated with a user, and may receive profile information associated with one or more other users. The systems and/or methods may link the profile information with one or more corresponding contacts in the address book, and may provide the address book with the linked profile information to one or more user devices associated with the user.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 15-19, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a computer device, one or more contacts provided in an address book associated with a user;
   receiving, by the computer device, profile information associated with one or more other users;
   linking, by the computer device, the profile information with corresponding one or more contacts provided in the address book;
   providing, by the computer device, the address book with the linked profile information to one or more user devices associated with the user;
   receiving, by the computer device, an indication of one of an update to the profile information or a change to the corresponding one or more contacts;
   comparing, by a processor associated with the computer device, a last contact synchronization (sync) file with a current server address book,
      the current server address book being based on the one or more contacts;
   generating, by the computer device, a server delta file based on the comparison between the last contact sync file and the current server address book, the server delta file comprising at least one of:
      an add operation for adding a new contact,
      a delete operation for deleting one contact of the one or more contacts, or
      an update operation for updating another contact of the one or more contacts;
   merging, by the computer device, the server delta file and a user device delta file to create a merged delta file,
      the user device delta file being based on a comparison between the last contact sync file and a current user device address book that is based on the one or more contacts, and
      the merging of the server delta file and the user device delta file including:
         determining a quantity of matching letters by comparing a first record in the server delta file and a second record in the user device delta file,
         determining whether a match threshold is met based on the quantity of matching letters,
         merging the first record and the second record to create a merged record when the match threshold is met, and
         adding the merged record to the merged delta file when the match threshold is met; and
   creating, by the computer device, a new contact sync file based on the merged delta file and the last contact sync file.

2. The method of claim 1, where each of the one or more contacts includes predefined fields.

3. The method of claim 1, where the profile information comprises at least one of:
   contact information associated with the one or more other users,
   personal information associated with the one or more other users,
   professional information associated with the one or more other users,
   personal preferences associated with the one or more other users, or
   collections of favorite music, movies, or pictures associated with the one or more other users.

4. The method of claim 1, further comprising:
   receiving an update to a profile linked to a particular contact, of the one or more contacts, provided in the address book;
   updating the particular contact provided in the address book based on the update to the profile; and
   providing an updated address book to the one or more user devices associated with the user.

5. The method of claim 1, further comprising:
   receiving, from one user device of the one or more user devices, a change to a particular contact, of the one or more contacts, provided in the address book;
   updating the particular contact provided in the address book based on the received change; and
   providing an updated address book to other user devices of the one or more user devices associated with the user.

6. The method of claim 1, further comprising:
   receiving, from a first user device of the one or more user devices, a profile search request;
   generating one or more profile search results based on the profile search request;
   providing the one or more profile search results to the first user device;
   receiving, from the first user device, a link request to link to a profile selected from the one or more profile search results;
   providing the link request to a second user device associated with the selected profile;
   receiving acceptance of the link request from the second user device;
   updating an address book associated with the first user device to include information associated with the selected profile; and
   providing the updated address book to the first user device.

7. The method of claim 1, further comprising:
   storing the address book in an address book contact table;
   storing the profile information in a profile table; and
   storing one or more links between the profile information and the one or more corresponding contacts in a link table.

8. The method of claim 1, where the computer device comprises a server.

9. The method of claim 1, where each of the one or more user devices comprises one or more of:
   a radiotelephone,
   a personal communications system (PCS) terminal,
   a personal digital assistant (PDA),
   a laptop, a personal computer,
a set-top box (STB),
a television, or
a personal gaming system.

10. A method comprising:
receiving, by a computing device, a last contact synchronization (sync) file and a user device delta file,
the user device delta file being based on a comparison between the last contact sync file and a current user device address book associated with a user device;
comparing, by the computing device, the last contact sync file with a current server address book associated with the computing device;
generating, by the computing device, a server delta file based on the comparison between the last contact sync file and the current server address book, the server delta file comprising at least one of:
an add operation for adding a new contact,
a delete operation for deleting an existing contact, or
an update operation for updating another existing contact;
merging, by the computing device, the server delta file and the user device delta file to create a merged delta file,
the merging of the server delta file and the user device delta file including:
determining a quantity of matching letters by comparing a first record in the server delta file and a second record in the user device delta file,
determining whether a match threshold is met based on the quantity of matching letters,
merging the first record and the second record to create a merged record when the match threshold is met, and
adding the merged record to the merged delta file when the match threshold is met; and
creating, by the computing device, a new contact sync file based on the merged delta file and the last contact sync file.

11. The method of claim 10, further comprising:
updating, by the computing device, the current server address book based on the merged delta file and the last contact sync file; and
providing the merged delta file to the user device to update the current user device address book based on the merged delta file and the last contact sync file.

12. The method of claim 10, where the merging of the server device delta file and the user device delta file further includes:
adding at least one of the first record or the second record to the merged delta file when the match threshold is not met.

13. A device comprising:
a memory; and
one or more processors to:
retrieve, from an address book contact table provided in the memory, a contact provided in an address book associated with a first user,
retrieve, from a profile table provided in the memory, a profile associated with a second user,
link the profile with the contact provided in the address book,
store the link in a link table provided in the memory,
provide the address book with the linked profile to one or more user devices associated with the first user,
compare a last contact synchronization (sync) file with a current server address book associated with the device,
the current server address book being based on the contact provided in the address book,
generate a server delta file based on the comparison between the last contact sync file and the current server address book, the server delta file comprising at least one of:
an add operation for adding a new contact,
a delete operation for deleting the contact or another contact, or
an update operation for updating the contact or the other contact,
determine a quantity of matching letters by comparing a first record in the server delta file and a second record in a user device delta file,
determine whether a match threshold is met based on the quantity of matching letters,
merge the first record and the second record to create a merged record when the match threshold is met,
merge the user device delta file and the server delta file to create a merged delta file based on the merged record when the match threshold is met,
the user device delta file being based on a comparison between the last contact sync file and a current user device address book of a user device of the one or more user devices, and
create a new contact sync file based on the merged delta file and the last contact sync file.

14. The device of claim 13, where the device comprises a server.

15. The device of claim 13, where each of the one or more user devices comprise one or more of:
a radiotelephone,
a personal communications system (PCS) terminal,
a personal digital assistant (PDA),
a laptop,
a personal computer,
a set-top box (STB),
a television, or
a personal gaming system.

16. The device of claim 13, where the contact includes predefined fields.

17. The device of claim 13, where the profile comprises at least one of:
contact information associated with the second user,
personal information associated with the second user,
professional information associated with the second user,
personal preferences associated with the second user, or
collections of favorite music, movies, or pictures associated with the second user.

18. The device of claim 13, where the one or more processors are further to:
receive an update to the profile linked to the contact provided in the address book,
update the contact provided in the address book based on the update, and
provide, to the one or more user devices, the address book including the updated contact.

19. The device of claim 18, where the one or more processors are further to:
store, in the address book contact table, the address book including the updated contact.

20. The device of claim 13, where the one or more processors are further to:
receive, from one of the one or more user devices, a change to the contact provided in the address book,
update the contact provided in the address book based on the received change, and provide, to the other one or more user devices, the address book including the updated contact.

21. The device of claim 13, where the one or more processors are further to:
receive, from a first user device of the one or more user devices associated with the first user, a profile search request,
generate one or more profile search results based on the profile search request,
provide the one or more profile search results to the first user device,
receive, from the first user device, a link request to link to a particular profile selected from the one or more profile search results,
provide the link request to a second user device associated with the selected profile,
receive acceptance of the link request from the second user device,
update the address book associated with the first user to include information associated with the selected profile, and
provide the updated address book to the first user device.

22. The device of claim 13, where the one or more processors are further to:
update the current server address book based on the merged delta file and the last contact sync file, and
store the updated current server address book in the memory.

23. A system comprising:
one or more servers to:
receive, from a first user device, a contact provided in an address book,
receive a profile from a second user device,
link the profile with the contact provided in the address book,
provide the address book with the linked profile to the first user device,
compare a last contact synchronization (sync) file with a current server address book associated with the first user device,
the current server address book being based on the address book,
generate a server delta file based on the comparison between the last contact sync file and the current server address book, the server delta file comprising at least one of:
an add operation for adding a new contact,
a delete operation for deleting the contact or another contact, or
an update operation for updating the contact or the other contact,
determine a quantity of matching letters by comparing a first record in the server delta file and a second record in a user device delta file,
determine whether a match threshold is met based on the quantity of matching letters
merge the first record and the second record to create a merged record when the match threshold is met,
merge the user device delta file and the server delta file to create a merged delta file based on the merged record when the match threshold is met,
the user device delta file being based on a comparison of the last contact sync file and a current user device address book of the first user device, and
create a new contact sync file based on the merged delta file and the last contact sync file.

24. The system of claim 23, where each of the first user device and the second user device comprises one or more of:
a radiotelephone,
a personal communications system (PCS) terminal,
a personal digital assistant (PDA),
a laptop,
a personal computer,
a set-top box (STB),
a television, or
a personal gaming system.

\* \* \* \* \*